United States Patent
Morisaki

(10) Patent No.: US 12,198,490 B2
(45) Date of Patent: Jan. 14, 2025

(54) STORE-ENTRY MANAGEMENT APPARATUS, STORE-ENTRY MANAGEMENT METHOD, AND NON-TRANSITORY COMPUTER-READABLE STORAGE MEDIUM

(71) Applicant: NEC Corporation, Tokyo (JP)

(72) Inventor: Mitsunori Morisaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 95 days.

(21) Appl. No.: 17/920,841

(22) PCT Filed: Apr. 28, 2021

(86) PCT No.: PCT/JP2021/016945
§ 371 (c)(1),
(2) Date: Oct. 24, 2022

(87) PCT Pub. No.: WO2021/221098
PCT Pub. Date: Nov. 4, 2021

(65) Prior Publication Data
US 2023/0206712 A1 Jun. 29, 2023

(30) Foreign Application Priority Data
Apr. 30, 2020 (JP) ................... 2020-080075

(51) Int. Cl.
*G07C 9/37* (2020.01)
*G06V 40/16* (2022.01)
*G07C 9/00* (2020.01)

(52) U.S. Cl.
CPC .............. *G07C 9/37* (2020.01); *G06V 40/161* (2022.01); *G07C 9/00563* (2013.01); *G07C 9/00896* (2013.01)

(58) Field of Classification Search
None
See application file for complete search history.

(56) References Cited

U.S. PATENT DOCUMENTS

| 9,692,380 | B2 * | 6/2017 | Herman | .............. G06F 3/165 |
| 2012/0030129 | A1 | 2/2012 | Kim et al. | |
| 2022/0245978 | A1 * | 8/2022 | Murata | .................. G06T 7/70 |

FOREIGN PATENT DOCUMENTS

| CN | 108846969 A | 11/2018 |
| JP | 2009-098814 A | 5/2009 |

(Continued)

OTHER PUBLICATIONS

International Search Report for PCT Application No. PCT/JP2021/018945, mailed on Jun. 22, 2021.

(Continued)

*Primary Examiner* — Daniell L Negron

(57) ABSTRACT

A store-entry management apparatus (100) includes: an output control unit (102) that causes, when a human detection sensor installed at an entrance of a store detects a person, an output unit (80) provided at the entrance to output voice guidance of a store-entry method; an acquisition unit (104) that acquires authentication information for authenticating a person from a terminal provided at the entrance; and an opening/closing control unit (106) that unlocks and opens a door of the entrance when the acquired authentication information satisfies a reference, wherein the output control unit (102) decides whether the voice guidance is needed by using a detection result of the human detection sensor before the authentication information is acquired, and controls an output of the voice guidance.

13 Claims, 17 Drawing Sheets

(56) References Cited

FOREIGN PATENT DOCUMENTS

| | | |
|---|---|---|
| JP | 2014-109916 A | 6/2014 |
| JP | 2016-071192 A | 5/2016 |
| JP | 2017-040956 A | 2/2017 |
| JP | 2017-210749 A | 11/2017 |
| WO | 2019/186880 A1 | 10/2019 |

OTHER PUBLICATIONS

JP Office Action for JP Application No. 2022-518112, mailed on Sep. 3, 2024 with English Translation.

* cited by examiner

STORE-ENTRY MANAGEMENT APPARATUS, STORE-ENTRY MANAGEMENT METHOD, AND NON-TRANSITORY COMPUTER-READABLE STORAGE MEDIUM

This application is a National Stage Entry of PCT/JP2021/016945 filed on Apr. 28, 2021, which claims priority from Japanese Patent Application 2020-080075 filed on Apr. 30, 2020, the contents of all of which are incorporated herein by reference, in their entirety.

TECHNICAL FIELD

The present invention relates to a store-entry management apparatus, a store-entry management method, and a program.

BACKGROUND ART

A terminal operated by a customer himself/herself, such as a self-service cash register at a supermarket and an automatic teller machine (ATM) at a financial institution and the like, is becoming widespread. Patent Document 1 describes that whether a customer is at a loss for an operation of a customer apparatus is analyzed based on an operation history of the customer, a degree of confusion of the customer about the operation of the customer apparatus is computed, and the computed degree of confusion together with an instruction of a follow-up to the customer determined to require an urgent follow-up may be notified to a user terminal of a person in charge of business. The operation history of the customer includes a dwell time in an operation menu, the number of display times of an operation menu of the same kind, the number of times of an operation error, time required for an operation, and the like.

Patent Document 2 describes that a degree of hesitation in an operation of a user in a user operation terminal apparatus is detected, and an effective operation support guide is provided. For example, instead of measuring a state where a customer hesitates in an operation by time required for the operation and the like, a state where a line of sight is wandering is determined based on a reference by detecting a line of sight of the customer on an operation screen and detecting a dwell time of the line of sight, and the like, and thus hesitation in the operation of the customer is detected. Then, it is described that an operation support guide associated with a dwell place of the line of sight is output.

RELATED DOCUMENTS

Patent Documents

[Patent Document 1] Japanese Patent Application Publication No. 2017-40956
[Patent Document 2] Japanese Patent Application Publication No. 2014-109916

SUMMARY OF INVENTION

Technical Problem

In recent years, a store conducting unattended business during the night starts a trial at a convenience store and the like as a measure against a labor shortage. At a store conducting unattended business, an entrance is basically locked, and an automatic door is unlocked and a store entry is allowed by a customer performing a predetermined authentication operation when the customer visits the store.

However, there are many customers who do not know the authentication operation for the store entry, and give up entering the store and leave even though the customers visit the store. Such customers who give up entering a store and leave are desired to be reduced.

The present invention has been made in view of the circumstance described above, and an object thereof is to guide a customer who visits a store to enter the store.

Solution to Problem

In each aspect according to the present invention, each configuration below is adopted in order to solve the above-mentioned problem.

A first aspect relates to a store-entry management apparatus.

The store-entry management apparatus according to the first aspect, including:
  an output control unit that causes, when a human detection sensor installed at an entrance of a store detects a person, an output unit provided at the entrance to output voice guidance of a store-entry method;
  an acquisition unit that acquires authentication information for authenticating a person from a terminal provided at the entrance; and
  an opening/closing control unit that unlocks and opens a door of the entrance when the acquired authentication information satisfies a reference, wherein
  the output control unit decides whether the voice guidance is needed by using a detection result of the human detection sensor before the authentication information is acquired, and controls an output of the voice guidance.

A second aspect relates to a store-entry management method of a store-entry management apparatus being executed by at least one computer.

The store-entry management method according to the second aspect, including,
  by the store-entry management apparatus:
  causing, when a human detection sensor installed at an entrance of a store detects a person, an output apparatus provided at the entrance to output voice guidance of a store-entry method;
  acquiring authentication information for authenticating a person from a terminal provided at the entrance;
  unlocking and opening a door of the entrance when the acquired authentication information satisfies a reference; and
  deciding whether the voice guidance is needed by using a detection result of the human detection sensor before the authentication information is acquired, and controlling an output of the voice guidance.

Note that, another aspect according to the present invention may be a program causing at least one computer to execute the method in the second aspect described above, or may be a computer-readable storage medium that stores such a program. The storage medium includes a non-transitory tangible medium.

The computer program includes a computer program code causing a computer to execute the store-entry management method on the store-entry management apparatus when the computer program code is executed by the computer.

Note that, any combination of the components above and expression of the present invention being converted among a method, an apparatus, a system, a storage medium, a computer program, and the like are also effective as a manner of the present invention.

Further, various components according to the present invention do not necessarily need to be an individually independent presence, and a plurality of components may be formed as one member, one component may be formed of a plurality of members, a certain component may be a part of another component, a part of a certain component and a part of another component may overlap each other, and the like.

Further, a plurality of procedures are described in an order in the method and the computer program according to the present invention, but the described order does not limit an order in which the plurality of procedures are executed. Thus, when the method and the computer program according to the present invention are executed, an order of the plurality of procedures can be changed within an extent that there is no harm.

Furthermore, a plurality of procedures of the method and the computer program according to the present invention are not limited to being executed at individually different timings. Thus, another procedure may occur during execution of a certain procedure, an execution timing of a certain procedure and an execution timing of another procedure may partially or entirely overlap each other, and the like.

Advantageous Effects of Invention

According to each of the aspects described above, guidance related to a store-entry method to an unattended store is efficiently output, a customer is guided to enter the store, and a decrease in a usage rate is prevented.

EXAMPLE EMBODIMENT

Hereinafter, example embodiments of the present invention will be described with reference to the drawings. Note that, in all of the drawings, a similar component has a similar reference sign, and description thereof will be appropriately omitted. Further, in each of the drawings, a configuration of a portion unrelated to essence of the present invention is omitted and not illustrated.

"Acquisition" in an example embodiment includes at least one of acquisition (active acquisition), by its own apparatus, of data or information being stored in another apparatus or a storage medium, and inputting (passive acquisition) of data or information output from another apparatus to its own apparatus. Examples of the active acquisition include reception of a reply by making a request or an inquiry to another apparatus, reading by accessing another apparatus or a storage medium, and the like. Further, examples of the passive acquisition include reception of information to be distributed (transmitted, push-notified, or the like), and the like. Furthermore, "acquisition" may include acquisition by selection from among pieces of received data or pieces of received information, or reception by selecting distributed data or distributed information.

First Example Embodiment

<System Outline>

Figure 1:
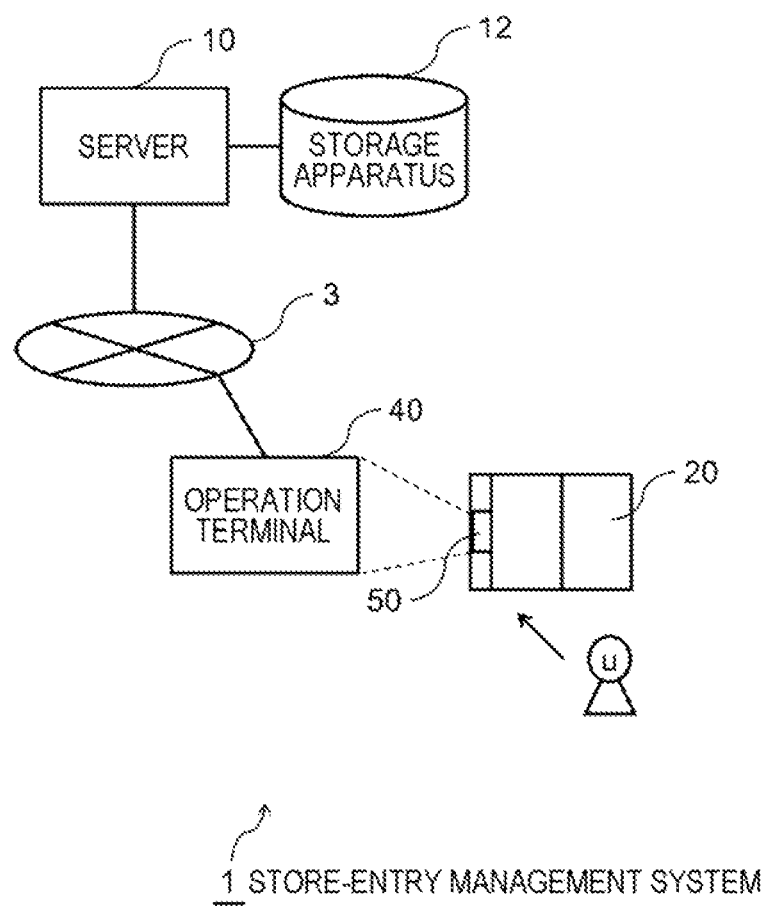
FIG. 1 is a diagram illustrating a configuration example of a store-entry management system according to an example embodiment of the present invention.

FIG. 1 is a diagram illustrating a configuration example of a store-entry management system 1 according to an example embodiment of the present invention. The store-entry management system 1 includes an operation terminal 40 and a server 10. The operation terminal 40 is included in a housing 50 provided on a side of an automatic door 20 of a store, and receives an operation of a customer U who visits the store. The operation terminal 40 includes a computer 1000 that achieves a store-entry management apparatus 100 described below. The server 10 and the operation terminal 40 are connected to each other via a communication network 3. The server 10 manages the operation terminal 40. The store-entry management system 1 further includes a storage apparatus 12.

The storage apparatus 12 stores and accumulates various pieces of information (for example, authentication information, store-visit information, and the like) used by the server 10. The storage apparatus 12 may be provided inside the server 10, or may be provided outside. In other words, the storage apparatus 12 may be hardware integral with the server 10, or may be hardware separated from the server 10.

Further, the storage apparatus 12 may be connected to the server 10 via the communication network 3.

<Hardware Configuration Example>

Figure 2:
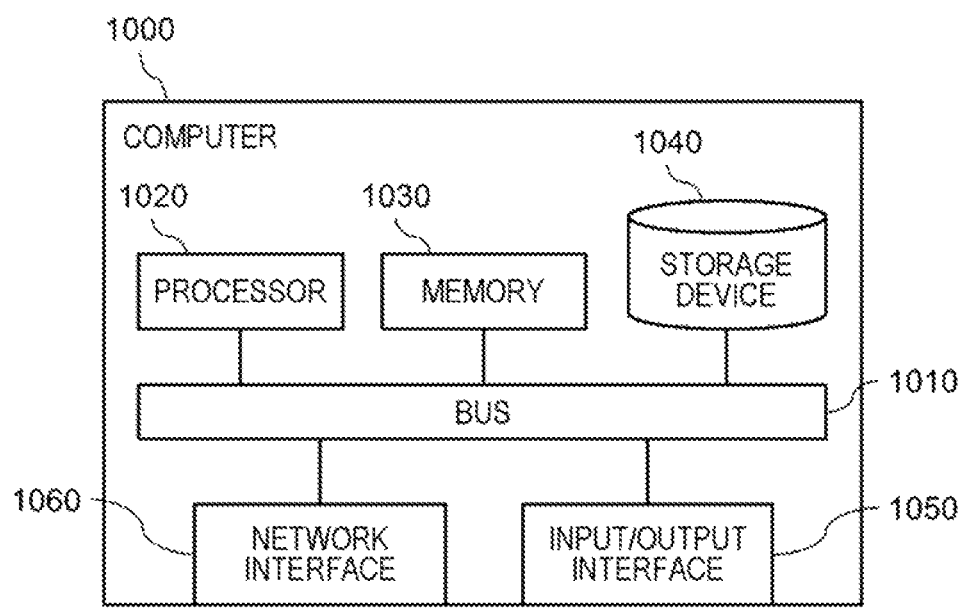
FIG. 2 is a block diagram illustrating a hardware configuration of a computer of an operation terminal that achieves a store-entry management apparatus according to the example embodiment.

FIG. 2 is a block diagram illustrating a hardware configuration of the computer 1000 of the operation terminal 40 that achieves the store-entry management apparatus 100 described below. The server 10 in FIG. 1 is also achieved by the computer 1000. Further, a function of the store-entry management apparatus 100 may be achieved by being shared between the operation terminal 40 and the server 10.

The computer 1000 includes a bus 1010, a processor 1020, a memory 1030, a storage device 1040, an input/output interface 1050, and a network interface 1060.

The bus 1010 is a data transmission path for allowing the processor 1020, the memory 1030, the storage device 1040, the input/output interface 1050, and the network interface 1060 to transmit and receive data with one another. However, a method of connecting the processor 1020 and the like to each other is not limited to bus connection.

The processor 1020 is a processor achieved by a central processing unit (CPU), a graphics processing unit (GPU), and the like.

The memory 1030 is a main storage apparatus achieved by a random access memory (RAM) and the like.

The storage device 1040 is an auxiliary storage apparatus achieved by a hard disk drive (HDD), a solid state drive (SSD), a memory card, a read only memory (ROM), or the like. The storage device 1040 stores a program module that achieves each function (for example, an output control unit 102, an acquisition unit 104, an opening/closing control unit 106, a decision unit 108, a notification unit 110, and the like described below) of the store-entry management apparatus 100. The processor 1020 reads each program module onto the memory 1030 and executes the program module, and each function associated with the program module is achieved. Further, the storage device 1040 may also store each piece of data of the storage apparatus 12 of the server 10.

The program module may be stored in a storage medium. The storage medium that stores the program module may include a non-transitory tangible medium usable by the computer 1000, and a program code readable by the computer 1000 (the processor 1020) may be embedded in the medium.

The input/output interface 1050 is an interface for connecting the computer 1000 and various types of input/output equipment. The input/output interface 1050 also functions as a communication interface that performs short-range wireless communication, such as Bluetooth (registered trademark) and Near Field Communication (NFC).

The network interface 1060 is an interface for connecting the computer 1000 to a communication network. The communication network is, for example, a local area network (LAN) and a wide area network (WAN). A method of connection to the communication network by the network interface 1060 may be wireless connection or wired connection.

Then, the computer 1000 is connected to necessary equipment (for example, a connection between the operation terminal 40 and the server 10, or a display 54, a code reader 56, an operation button such as a capturing button 60, a camera 62, a speaker 66, and a microphone 68 of the operation terminal 40 that are described below, a keyboard, a mouse, a speaker, a microphone, and a printer of the server 10 that are not illustrated, and the like) via the input/output interface 1050 or the network interface 1060.

Figure 3:
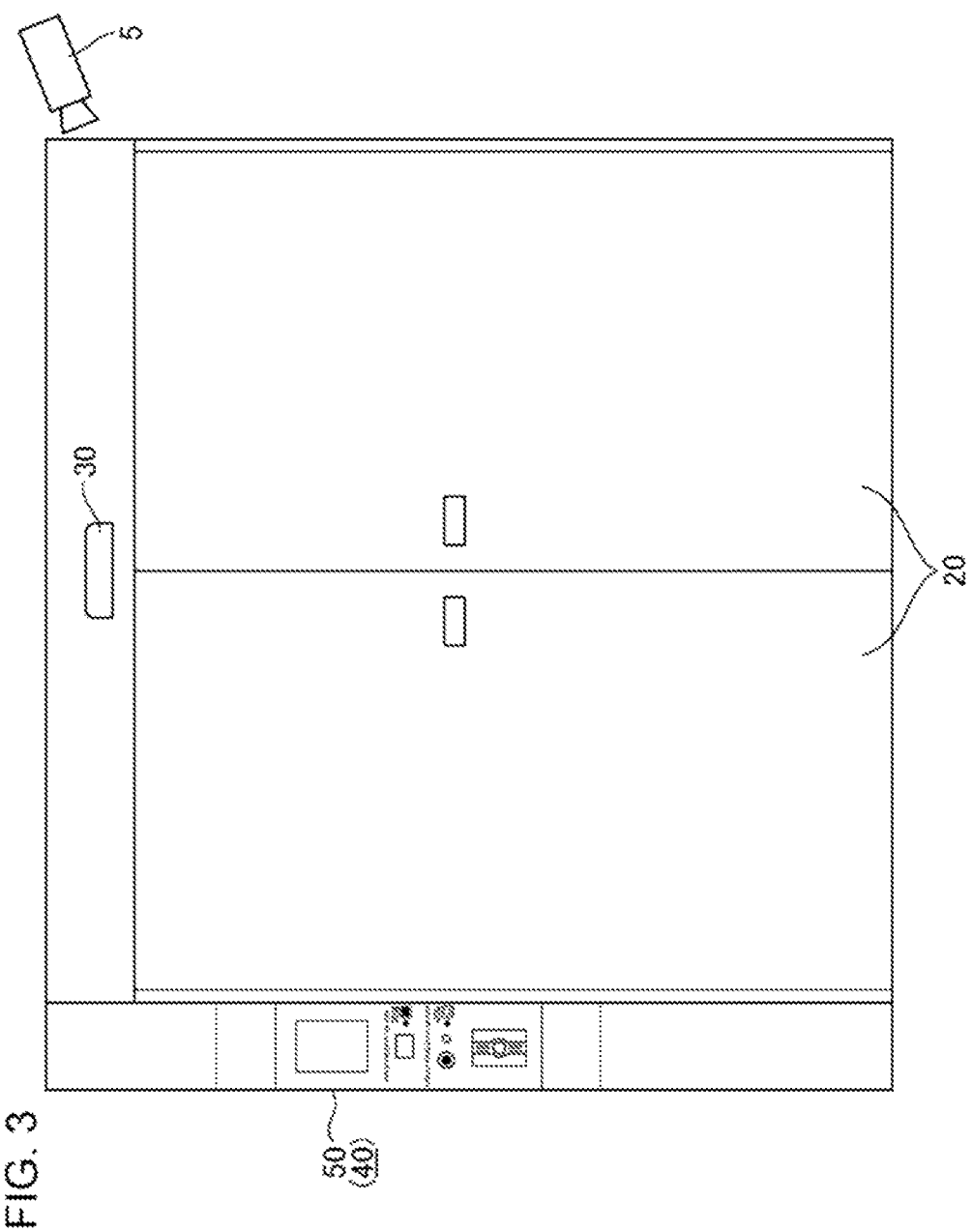
FIG. 3 is a front view of an entrance of a store viewed from the outside of the store.

FIG. 3 is a front view of an entrance of a store viewed from the outside of the store. As described above, the automatic door 20 and the housing 50 including the operation terminal 40 on the side of the automatic door 20 are provided at the entrance of the store. The store-entry management system 1 further includes a camera 5 and a sensor 30.

The camera 5 is provided near the automatic door 20, and captures a person approaching the front of the automatic door 20. The camera 5 includes a lens and a capturing element such as a charge coupled device (CCD) image sensor. An image captured by the camera 5 is at least any one of a video, a still image, and a frame image for each predetermined interval. The camera 5 may be a surveillance camera for crime prevention being provided at an entrance of a store.

The sensor 30 is provided on an upper portion of the automatic door 20, and detects a person standing in front of the automatic door 20. The sensor 30 is, for example, an infrared sensor and the like.

A communication means between the camera 5 and/or the sensor 30, and the store-entry management apparatus 100 (the operation terminal 40 and/or the store-entry management apparatus 100) is not particularly limited, and a communication method in either a wired manner or a wireless manner may be used.

Figure 4:
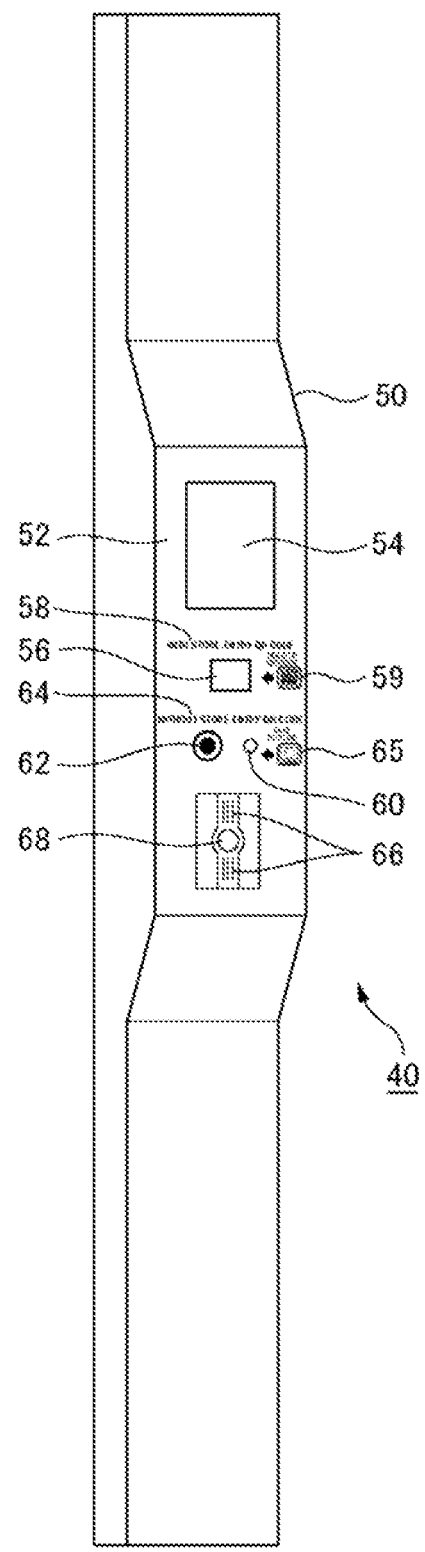
FIG. 4 is an external view of a housing in which the operation terminal is provided.

FIG. 4 is an external view of the housing 50 in which the operation terminal 40 is provided. The computer 1000 in FIG. 2 that achieves the operation terminal 40 is included inside the housing 50. The display 54, the code reader 56, the capturing button 60, the camera 62, the speaker 66, and the microphone 68 of the operation terminal 40 are provided on a front surface 52 of the housing 50.

The display 54 is a liquid crystal display or an organic electro luminescence (EL) display, and may be a touch panel that receives an operation of a user. The code reader 56 reads a QR code (registered trademark), a bar code, and the like held up over a reading surface. The camera 62 captures a face of the customer U standing in front of the operation terminal 40. The capturing button 60 is an operation button for capturing the face of the customer U by the camera 62. However, the capturing button 60 may be a graphical user interface (GUI) such as an operation button displayed on a touch panel (the display 54). The speaker 66 outputs voice guidance and outputs a notification sound to the customer U. The microphone 68 collects a spoken speech of the customer U and an environmental sound around a store.

In the present example embodiment, the operation terminal 40 is operated when the customer U enters a store in a case where the store conducts unattended business. The customer U may be a member who performs user registration in advance on use of a member service provided by the store, or may not be a member. In a case of a member, for example, membership identification information such as a membership number is assigned to the customer U, and, for example, a membership card on which a bar code, a QR code (registered trademark), or the like indicating the membership number is described, and the like may be distributed.

Alternatively, by activating an application that provides the membership service by a smartphone and the like of the customer U, and performing a login by using user information such as a user ID and a password registered at a time of user registration, a bar code or a QR code indicating a membership number may be displayed on a display of a portable terminal. By accessing a predetermined Web page that provides a membership service by using a browser instead of an application, and performing a login to a membership page by using user information, a bar code or a QR code indicating a membership number may be displayed on a display of a portable terminal.

Hereinafter, a QR code used for a store entry by the customer U is also referred to as a store-entry QR code. The store-entry QR code includes information (for example, a membership number) that can determine a member. Furthermore, the store-entry QR code may have a validity period, and may also include information about the validity period.

Further, the code reader 56 may be an IC card reader. By registering information indicating a membership number in advance in an IC memory of a portable terminal of the customer U, and bringing the portable terminal into touch the IC card reader, the information indicating the membership number may be read by the IC card reader.

Furthermore, a membership number of the customer U can also be transmitted to the operation terminal 40 by reading a store-entry QR code on a store side by a smartphone of the customer U and performing an operation according to an operation screen of a predetermined Web page indicated by the QR code.

Specifically, the operation terminal 40 further includes a near-field communication means (not illustrated) such as Bluetooth (registered trademark). Further, the store-entry QR code is posted on a wall surface, a door, a front surface of the operation terminal 40, and the like at an entrance of a store, or is displayed on the display 54 of the operation terminal 40.

Then, the store-entry QR code is read by the smartphone of the customer U. Then, a predetermined Web page indicated by the QR code is accessed and open, and an operation is performed according to an operation screen of the Web page. When the operation is received, a membership number is transmitted to the operation terminal 40 by using a near-field communication means (for example, Bluetooth (registered trademark)) of the smartphone. The operation terminal 40 can receive the membership number from the smartphone of the customer U by using the near-field communication means. The membership number may be a temporary membership number for a visitor, or may be a membership number of the customer U determined by logging in to a membership page on the predetermined Web page indicated by the QR code. The membership number may be stored in a memory of the smartphone of the customer U, or may be acquired and transmitted to the operation terminal 40 by accessing and logging in to a Web page for a member with the QR code.

Further, when the customer U has not performed membership registration of a store, a store entry is allowed by capturing an image of the face of the customer U by the camera 62 provided in the operation terminal 40. In the present example embodiment, the customer U is caused to press the capturing button 60 in order to obtain consent for capturing the face from the customer U.

<Functional Configuration Example>

Figure 5:
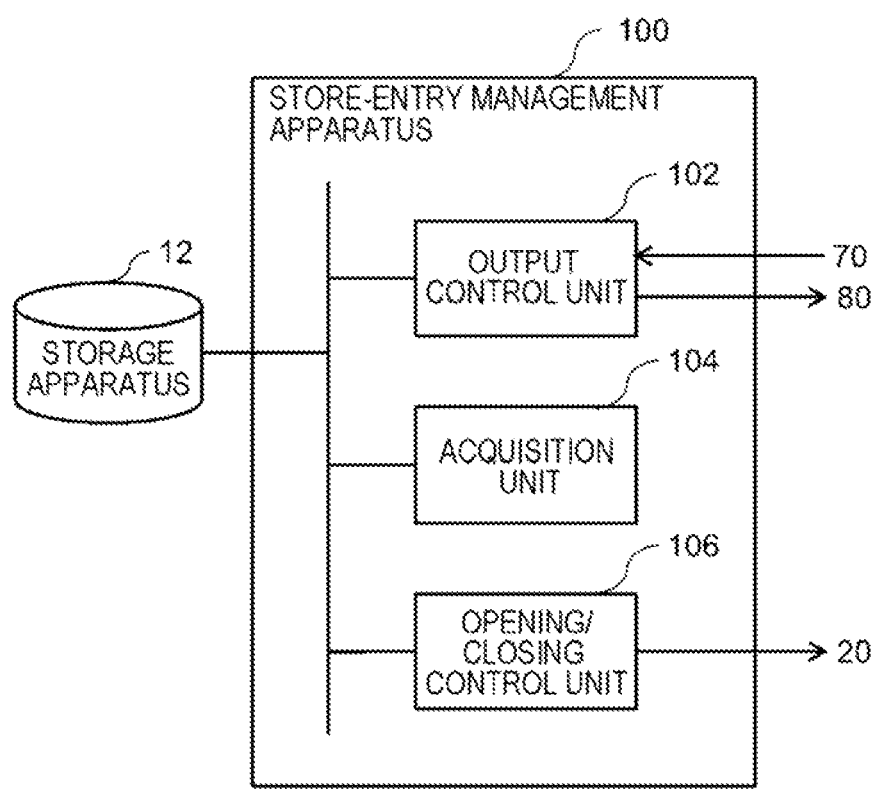
FIG. 5 is a functional block diagram logically illustrating a configuration of the store-entry management apparatus according to the example embodiment of the present invention.

FIG. 5 is a functional block diagram logically illustrating a configuration of the store-entry management apparatus 100 according to the example embodiment of the present invention. The store-entry management apparatus 100 includes the output control unit 102, the acquisition unit 104, the opening/closing control unit 106.

When a human detection sensor 70 installed at an entrance of a store detects a person, the output control unit 102 causes an output unit 80 (such as the speaker 66 in FIG. 4) provided at the entrance to output voice guidance of a store-entry method. The acquisition unit 104 acquires authentication information for authenticating the person from the operation terminal 40 provided at the entrance. When the acquired authentication information satisfies a reference, the opening/closing control unit 106 unlocks and opens the automatic door 20 at the entrance. The output control unit 102 decides whether voice guidance is needed by using a detection result of the human detection sensor 70 before the authentication information is acquired, and controls an output of the voice guidance.

The authentication information is, for example, a face image used for face authentication or a feature value of the face image, or information that can determine a member such as a membership number. However, the authentication information may be other biometric authentication information other than face authentication. The other biometric authentication information includes at least any one feature value such as an iris, a vein, an auricle, a fingerprint, a gait, and a stature (such as a height, a shoulder width, a body length, and a bone structure), for example.

The human detection sensor 70 is at least one of an infrared sensor (sensor 30) installed near the automatic door 20 in FIG. 3 and an image sensor by analysis processing on an image of the camera 5, which is not limited thereto. The output unit 80 is at least one of the speaker 66 and the display 54 of the operation terminal 40 in FIG. 4. Alternatively, the output unit 80 may be another illumination unit such as a light emitting diode (LED) provided in the operation terminal 40. When the output unit 80 is an LED, the output control unit 102 controls turning on, blinking, turning off, and the like of the LED.

As described above, a case where the customer U is a member of a store and a case where the customer U is not a member are assumed. Alternatively, a case where, although the customer U is a member, the customer U does not carry a membership certificate for proving a code of being a member, or the like is also conceivable.

An operation for the customer U to enter a store varies between when the customer U is a member and when the customer U is not a member (or also including a case where the customer U forgets a membership card). When the customer U is a member, the customer U can enter a store by displaying a membership card or displaying a store-entry QR code or the like on a portable terminal (not illustrated) of the customer U, and causing the code reader 56 to read membership information by holding up the membership card, the store-entry QR code, or the like over the code reader 56. On the other hand, when the customer U is not a member, an image in which the face of the customer U is captured is temporarily stored.

Unlocking and opening of the automatic door 20 refers to unlocking of the automatic door 20 that is locked during unattended business, and also automatic opening. Further, when a store entry of the customer U is detected by the sensor 30, it is preferable that the automatic door 20 is automatically locked again, and another person other than the customer U cannot enter the store from the outside of the store. However, it is assumed that the automatic door 20 can be unlocked and opened by a predetermined operation (for example, human detection by the human detection sensor 70, authentication (face authentication, or provision of a membership card or a store-entry QR code), or the like) from the inside the store, and the customer U can go outside.

Further, unattended business includes a business form such as a state where a salesclerk is absent at a store or a salesclerk is present at a store but is unavailable to serve a customer, for example, a so-called one-man operation state.

<Operation Example>

Figure 6:
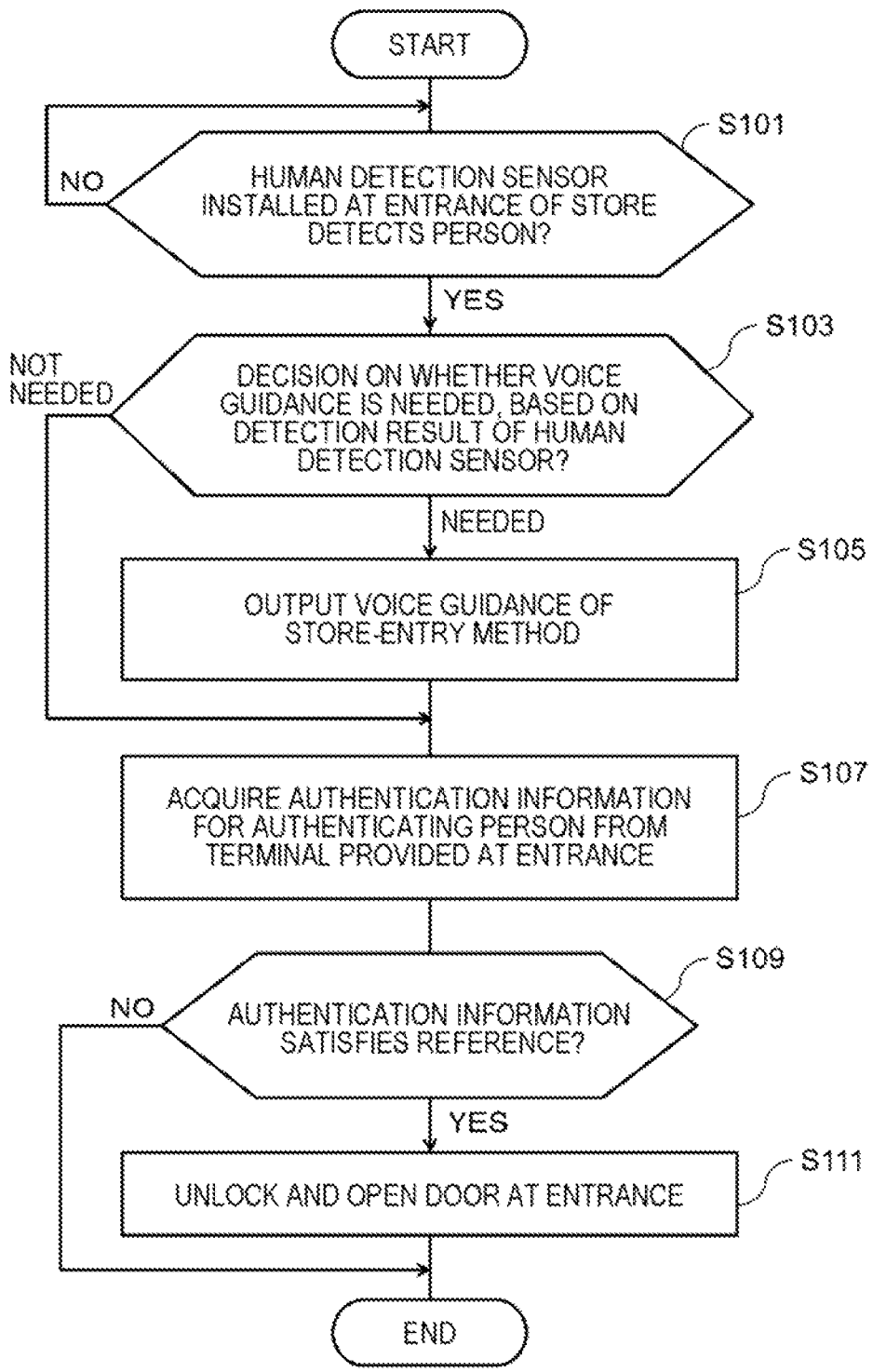
FIG. 6 is a flowchart illustrating an operation example of the store-entry management apparatus according to the example embodiment.

FIG. 6 is a flowchart illustrating an operation example of the store-entry management apparatus 100 according to the present example embodiment.

First, when the human detection sensor 70 (detection by the sensor 30 or a captured image analysis of the camera 5) installed at an entrance of a store detects a person (YES in step S101), the output control unit 102 decides whether voice guidance is needed by using a detection result of the human detection sensor 70 before authentication information is acquired (step S103). The output control unit 102 waits until the human detection sensor 70 detects a person (NO in step S101).

When an output of the voice guidance is needed (NEEDED in step S103), the output control unit 102 causes the speaker 66 provided at the entrance to output the voice guidance of a store-entry method (step S105). For example, when the sensor 30 above the automatic door 20 detects presence of the customer U in front of the automatic door 20, the voice guidance for notifying the customer U of presence of the operation terminal 40, such as "Move toward the front of operation panel on left side of automatic door.", is output from the speaker 66 of the operation terminal 40.

On the other hand, when the output of the voice guidance is not needed (NOT NEEDED in step S103), the processing bypasses step S105 and proceeds to S107 without the output control unit 102 outputting the voice guidance. This is, for example, a case where the customer U present in front of the operation terminal 40 is detected by an analysis result of an image of the camera 5, and the like.

Then, the acquisition unit 104 acquires authentication information for authenticating the person from the operation terminal 40 provided at the entrance (step S107). Specifically, for example, the customer U holds up, over the code reader 56 of the operation terminal 40, a store-entry QR code displayed on a portable terminal of the customer U, and thus membership information about the customer U is read, and the acquisition unit 104 acquires the membership information as the authentication information. Alternatively, when the customer U is not a member, the customer U presses the capturing button 60 of the operation terminal 40, and the camera 62 captures the face of the customer U. The acquisition unit 104 acquires, as the authentication information, a face image of the customer U captured by the camera 62.

When the acquired authentication information satisfies a reference (YES in step S109), the opening/closing control unit 106 unlocks and opens the automatic door 20 at the entrance (step S111). On the other hand, when the authentication information does not satisfy the reference (NO in step S109), the processing bypasses step S111, and the present processing ends without the automatic door 20 being unlocked and opened.

For example, the authentication information satisfies the reference when the authentication information (membership information) read from a store-entry QR code is verified with membership information of the store being registered in the storage apparatus 12 of the server 10, and a member of the store can be determined. When there is no piece of coinciding membership information of the store, the reference is not satisfied.

According to the present example embodiment, whether voice guidance is needed is decided at a store in unattended business, and the voice guidance is then output when necessary, and thus the voice guidance is not unnecessarily output outside the store. Further, presence of the operation terminal 40 located beside the automatic door 20 of the store and needed for a store entry can be notified to the customer U by the voice guidance, as necessary. In this way, the guidance related to a store-entry method to a store in unattended business can be efficiently output, and the customer U can be guided to enter the store. Thus, a decrease in a usage rate of the store can be prevented.

Second Example Embodiment

Figure 7:
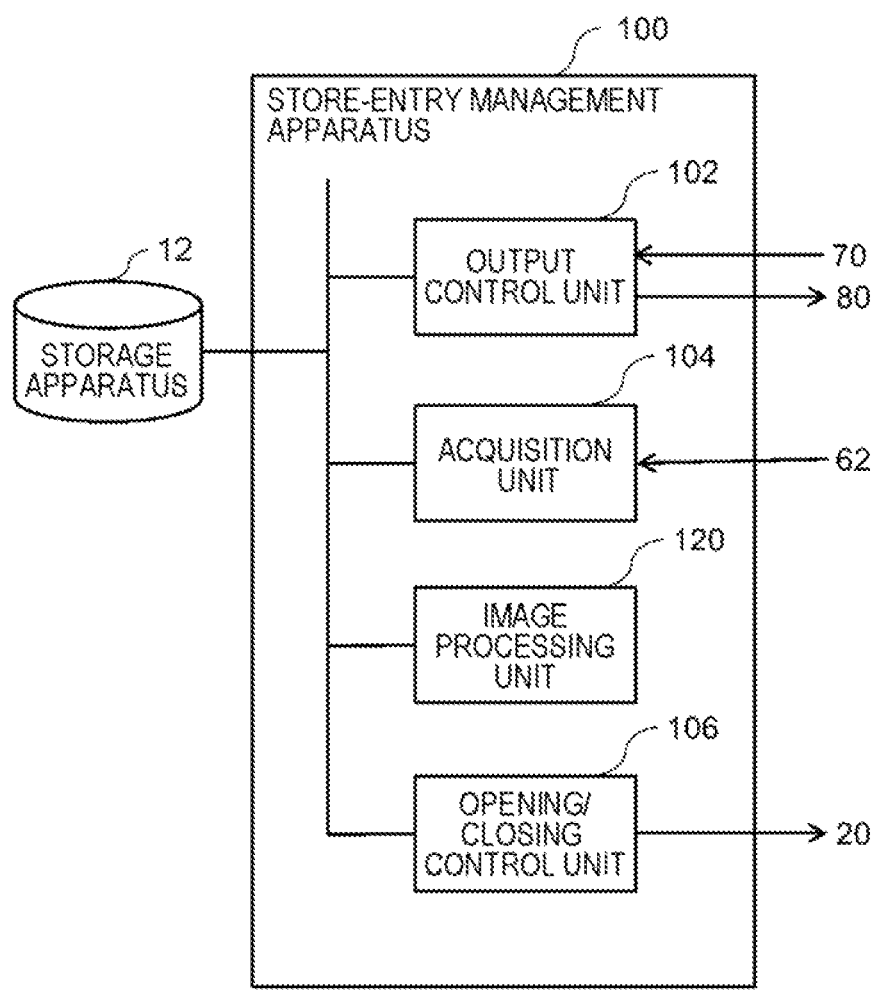
FIG. 7 is a functional block diagram logically illustrating a configuration example of a store-entry management apparatus according to an example embodiment.

FIG. 7 is a functional block diagram logically illustrating a configuration example of a store-entry management apparatus 100 according to the present example embodiment. The store-entry management apparatus 100 according to the present example embodiment is the same as that in the example embodiment described above except for a point that authentication information is an image in which a face of a person is captured. The store-entry management apparatus 100 according to the present example embodiment further includes an image processing unit 120 in addition to the configuration of the store-entry management apparatus 100 according to the example embodiment described above in FIG. 5. The image processing unit 120 may be included inside an operation terminal 40, or may be located outside the operation terminal 40. In other words, the image processing unit 120 and the operation terminal 40 may be separate pieces of hardware. For example, the image processing unit 120 may be connected to the operation terminal 40 via a communication network 3. Alternatively, the image processing unit 120 may be included in a server 10.

<Functional Configuration Example>

In the present example embodiment, the authentication information is an image in which a face of a person is captured, and an opening/closing control unit 106 unlocks and opens a door of an entrance when an analysis result of the face included in the image satisfies a reference.

As illustrated in FIG. 4, a capturing button 60, a camera 62, and a capturing target description portion 64 are provided on a front surface 52 of a housing 50 of the operation terminal 40. On the capturing target description portion 64, description indicating that a person who does not have a store-entry QR code is a capturing target is described. On a capturing icon display portion 65, an arrow indicating a position of a button to be pressed when a face is captured, and an icon of a camera are described.

Furthermore, as illustrated in FIG. 4, a code reader 56, a reading description portion 58, and a reading icon display portion 59 are provided on the front surface 52 of the housing 50 of the operation terminal 40. On the reading description portion 58, description that a person who has the store-entry QR code performs reading with the code reader 56 is described. On the reading icon display portion 59, an icon schematically illustrating a QR code and an arrow indicating a position of the code reader 56 are described.

In the present example embodiment, when a customer U does not have the store-entry QR code, an output control unit 102 outputs, from an output unit 80 (a speaker 66 of the operation terminal 40 in FIG. 4), voice guidance (for example, "Press capturing button for capturing face by camera of operation panel.", or the like) that prompts the customer U to press the capturing button 60 for capturing a face image.

Further, when the customer U has the store-entry QR code, the output control unit 102 outputs, from the output unit 80 (the speaker 66 of the operation terminal 40 in FIG. 4), voice guidance that prompts the customer U to hold up the store-entry QR code over the code reader 56.

When an acquisition unit 104 receives pressing of the capturing button 60 by the customer U, the acquisition unit 104 captures a face of the customer U by using the camera 62, and acquires a face image as authentication information.

The image processing unit 120 analyzes the face image acquired by the acquisition unit 104, and judges whether an image having image quality in which a predetermined feature value needed for performing authentication processing can be extracted is acquired, for example. Alternatively, the image processing unit 120 judges whether a feature value extracted from the face image has a feature value being identifiable from another person, that is, is equal to or more than a reference value. The image processing unit 120 may store, in a storage apparatus 12, at least one of the face image and the feature value extracted from the face image as a store-visit record in association with date and time information.

When the face image does not satisfy the reference, the output control unit 102 may further output voice guidance that includes advice in such a way as to acquire an image with high accuracy and prompts the customer U to perform capturing again, such as "Your face cannot be recognized. Direct front of your face toward camera, and capture your face by pressing capturing button again".

<Operation Example>

An operation of the store-entry management apparatus 100 according to the present example embodiment is the same as that in FIG. 6 according to the example embodiment described above, but, in step S107, authentication information acquired by the acquisition unit 104 is a face image of the customer U captured by the camera 62 of the operation terminal 40, and, in step S109, when a feature value extracted from the face image is equal to or more than a reference value, the opening/closing control unit 106 judges that the authentication information satisfies the reference (YES in step S109). The other processing is similar to that in FIG. 6.

According to the present example embodiment, the face of the customer U is captured in front of the operation terminal 40 when pressing of the capturing button 60 of the operation terminal 40 is received, and a captured face image of the customer U is the authentication information. As illustrated in FIG. 4, the capturing target description portion 64 and the capturing icon display portion 65 are provided on the front surface 52 of the housing 50, and thus the customer U can perform capturing of a face image by viewing the descriptions.

Furthermore, when a face image is used as the authentication information, advice can be output to the customer U by voice guidance in such a way that the face image satisfies a reference, and thus, in that case, an image having excellent image quality can be acquired as the authentication information.

Third Example Embodiment

A store-entry management apparatus 100 according to the present example embodiment is similar to that in any of the example embodiments described above except for a point that the store-entry management apparatus 100 according to the present example embodiment has a configuration for outputting first guidance when a human detection sensor 70 detects a person before acquisition processing of authentication information starts. Description will be given on an assumption that the store-entry management apparatus 100 according to the present example embodiment has the same configuration as that of the store-entry management apparatus 100 according to the second example embodiment in FIG. 7, but may have the same configuration as that of the store-entry management apparatus 100 according to the first example embodiment in FIG. 5.

As illustrated in FIG. 3, an operation terminal 40 is installed beside an automatic door 20. Then, an output control unit 102 causes an output unit 80 to output the first guidance when the human detection sensor 70 detects a person before the operation terminal 40 starts the acquisition processing of authentication information.

Herein, for example, the first guidance is for guiding a customer U to the operation terminal 40, and includes voice guidance such as "Move toward front of operation panel on left side of automatic door". Furthermore, the first guidance may also be used for notifying the customer U of presence of the operation terminal 40 by outputting a notification sound from a speaker 66, displaying a video on a display 54 of the operation terminal 40, or outputting a voice while displaying a message image such as "Operation panel is here".

Furthermore, the first guidance may be acquired by outputting guidance that simply describes an operation needed for a store entry, such as "Our store is in unattended business. You can enter our store by performing operation needed for store entry with operation panel on left of automatic door." or "You can enter our store by holding up store-entry QR code or capturing your face with operation panel on left of automatic door.", by using at least any one of a voice, an image, and a video.

Figure 8:
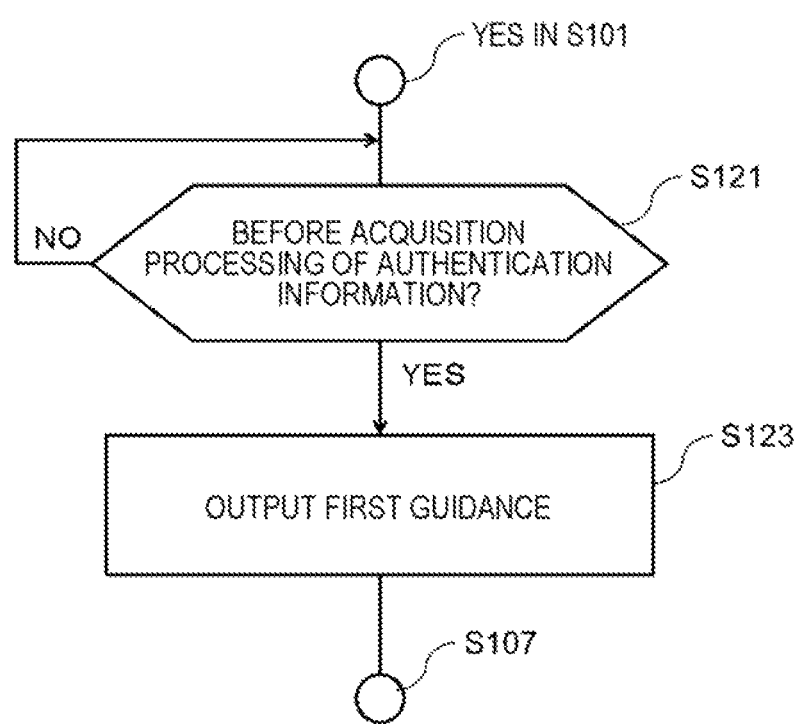
FIG. 8 is a flowchart illustrating an operation example of a store-entry management apparatus according to an example embodiment.

FIG. 8 is a flowchart illustrating an operation example of the store-entry management apparatus 100 according to the present example embodiment. The flowchart according to the present example embodiment is performed instead of step S103 and step S105 in FIG. 6 after the human detection sensor 70 at an entrance of a store detects a person by a judgment in step S101 in FIG. 6 (YES in step S101).

After the human detection sensor 70 at the entrance of the store detects the person (YES in step S101), a judgment about whether it is before the acquisition processing of authentication information by an acquisition unit 104 is performed (step S121). When it is before the acquisition processing (YES in step S121), the output control unit 102 outputs the first guidance from the output unit 80 (step S123).

For example, at a store conducting attended business, the human detection sensor 70 of the automatic door 20 detects a person standing in front of the automatic door 20, and the automatic door 20 automatically opens. However, at a store conducting unattended business, the automatic door 20 is locked, and thus the automatic door 20 does not open even when a person stands in front of the automatic door 20. The automatic door 20 is unlocked and opened by performing an authentication operation for a store entry with the operation terminal 40 installed near the automatic door 20, and a store enter is allowed. However, a person who is not familiar with an unattended store and a person who does not know or does not notice that a store is in unattended business go straight to the automatic door 20 when the person tries to enter the store. Thus, when the door does not open although the person stands in front of the automatic door 20, the person thinks that the door is faulty or the store is not open, and often leaves there.

According to the present example embodiment, in such a situation, for example, the operation terminal 40 installed near the automatic door 20 can output the first guidance to the customer U who visits the store, and notify the customer U of presence of the operation terminal 40.

In other words, presence of the operation terminal 40 can be noticed by the customer by outputting the first guidance such as "Move toward front of operation panel on left side of automatic door.", "Operation panel is here.", "Our store is in unattended business. You can enter store by performing operation needed for store entry with operation panel on left of automatic door.", and "You can enter store by holding up store-entry QR code or capturing face with operation panel on left of automatic door".

Further, since the operation terminal 40 includes the display 54, a position of the operation terminal 40 can be notified to the customer U by lighting the display 54 or displaying a message such as "Operation panel is here".

In this way, a customer can be guided to enter a store without the customer giving up and leaving even at a store in unattended business. Thus, a decrease in a usage rate of the store by the customer can be prevented.

Fourth Example Embodiment

A store-entry management apparatus 100 according to the present example embodiment is the same as that in the third example embodiment except for a point that the store-entry management apparatus 100 according to the present example embodiment has a configuration for outputting different second guidance when a customer who visits a store and cannot enter the store is detected even after the first guidance is output. Description will be given on an assumption that the store-entry management apparatus 100 according to the present example embodiment has the same configuration as that of the store-entry management apparatus 100 according to the second example embodiment in FIG. 7 and the third example embodiment, but may have the same configuration as that of the store-entry management apparatus 100 according to the first example embodiment in FIG. 5.

An output control unit 102 causes the second guidance different from the first guidance to be output when a human detection sensor 70 continues to detect a person even after the first guidance is output. A volume of the second guidance is smaller than a volume of the first guidance.

A fact that the human detection sensor 70 continues to detect a person means that the person cannot enter a store and stays in front of an entrance of the store, and a situation where the person does not know a store-entry method and is at a loss is assumed. Thus, the second guidance may include, for example, a content that lectures a customer about a store-entry method by using an operation terminal 40.

For example, the second guidance may describe, by using a video, an image, and characters on a display 54 of the operation terminal 40, a store-entry method in each of cases with and without a store-entry QR code. At this time, the second guidance is used on an assumption that a person is standing in front of the operation terminal 40, and thus a volume may be smaller than that of the first guidance for calling a person from the front of an automatic door to the operation terminal 40. Alternatively, the output control unit 102 may display description of the store-entry method with an image and characters on the display 54 without performing a voice output.

Whether detection of a person by the human detection sensor 70 continues can be determined by detecting a continuous input of a signal indicating a detection state from a sensor or continuous presence of the same person around the automatic door 20 or the operation terminal 40 at a store by an analysis of a captured image of a camera 5.

<Operation Example>

Figure 9:
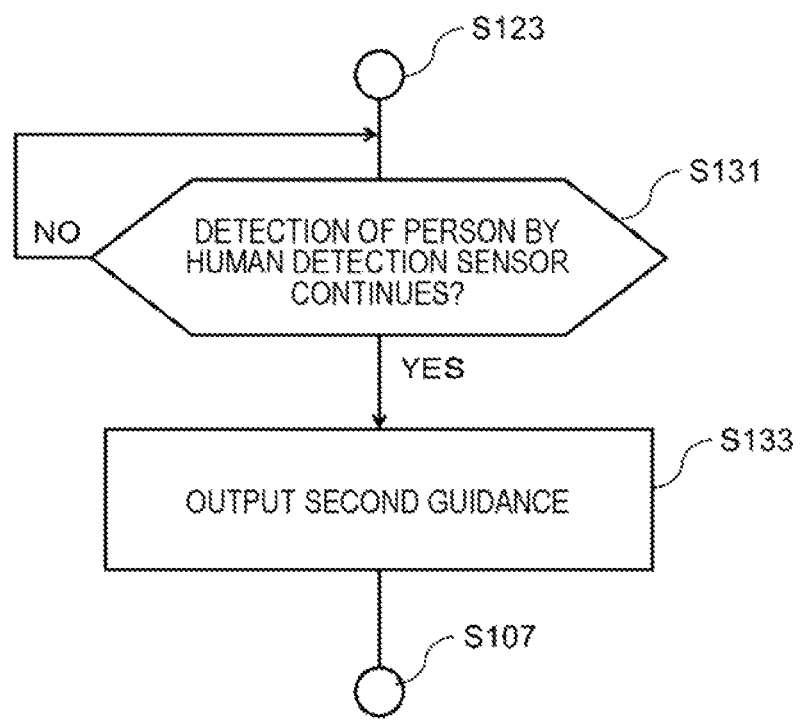
FIG. 9 is a flowchart illustrating an operation example of a store-entry management apparatus according to an example embodiment.

FIG. 9 is a flowchart illustrating an operation example of the store-entry management apparatus 100 according to the present example embodiment. The flowchart in the present example embodiment is performed after step S123 in FIG. 8. When the first guidance is output from the output control unit 102 (step S123), and the human detection sensor 70 then continues to detect a person (YES in step S131), the output control unit 102 causes an output unit 80 to output the second guidance different from the first guidance (step S133).

According to the present example embodiment, when a person who visits a store in unattended business is in a situation where the person does not know a store-entry method and is at a loss in front of the store, the second guidance for giving a lecture about the store-entry method can be output. In this way, a situation where a customer does not know the store-entry method, gives up, and leaves can be prevented, and a usage rate of the store by the customer can be improved. Further, the second guidance has a volume smaller than that of the first guidance for calling a person from the front of the automatic door 20 at an entrance of a store to the operation terminal 40 or has no voice, and thus a measure against noise to a neighborhood of the store is taken.

Modification Aspect of Fourth Example Embodiment

Figure 16:
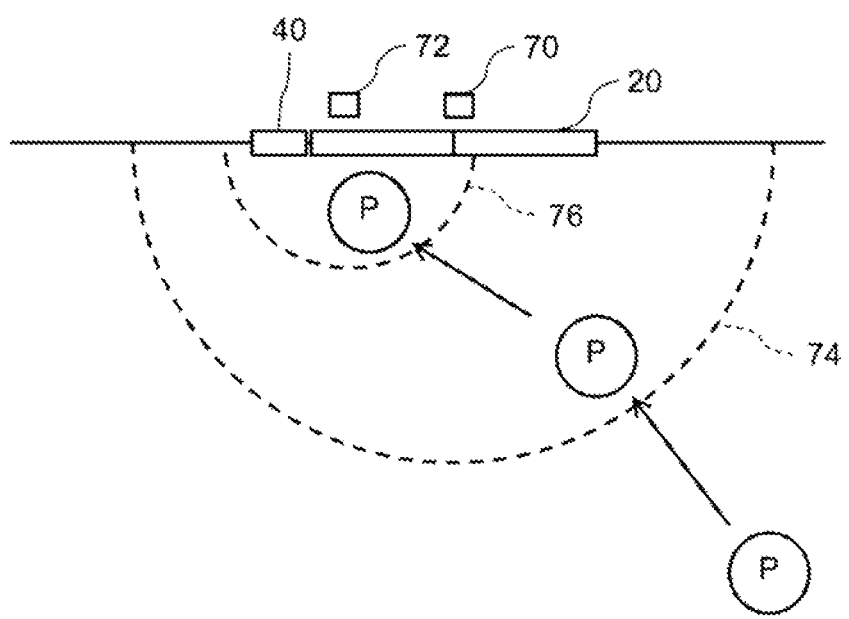
FIG. 16 is a diagram illustrating an arrangement of human detection sensors in a modification aspect.

As a modification aspect of the fourth example embodiment, presence of the same person may be detected in at least two stages by using at least two human detection sensors 70 and 72. FIG. 16 is a diagram illustrating an arrangement of the human detection sensors in the present modification aspect. For example, it is assumed that the two human detection sensors 70 and 72 have different detection ranges, and the first human detection sensor 70 has a detection range 74 wider than that of the second human detection sensor 72. The second human detection sensor 72 has a detection range 76 near the operation terminal 40 or the automatic door 20, and the first human detection sensor 70 includes a range away from the automatic door 20 in the detection range.

When a person P approaches a store, first, the first human detection sensor 70 detects the person within the first detection range 74 and outputs the first guidance, the second human detection sensor 72 then detects presence of the person within the second detection range 76, and the output control unit 102 may cause the second guidance different from the first guidance to be output. Then, a volume of the second guidance may be smaller than a volume of the first guidance.

Further, when the first human detection sensor 70 detects a person and the second human detection sensor 72 does not then detect the person even after a predetermined period of time has elapsed, the first guidance may be output again.

<Operation Example>

Figure 17:
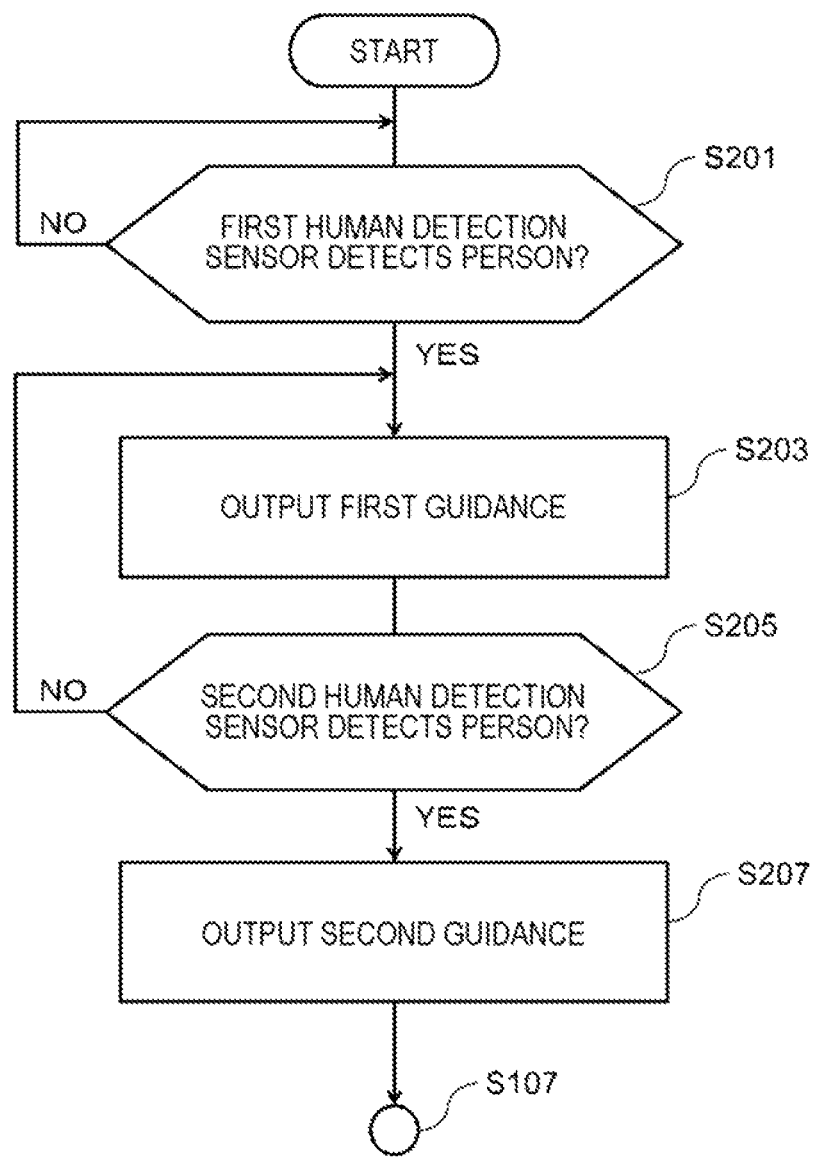
FIG. 17 is a flowchart illustrating an operation example of a store-entry management apparatus according to a modification aspect.

FIG. 17 is a flowchart illustrating one example of an operation of the store-entry management apparatus 100 according to the present modification aspect. When the person P is detected by the first human detection sensor 70 (YES in step S201) and the first guidance is then output (step S203), the output control unit 102 judges whether the second human detection sensor 72 detects the person P (step S205).

When the person P is not detected by the second human detection sensor 72 (NO in step S205), the processing returns to step S203, and the output control unit 102 causes the output unit 80 to output the first guidance again (step S203).

This example indicates that the person P remains at a place (within the detection range 74) slightly away from a store, and has not entered the detection range 76 of the second human detection sensor 72. A fact that the person P remains within the detection range 74 means that the person P does not come close to the operation terminal 40. In other words, there is a high possibility that the person P does not know a place of the operation terminal 40 and is at a loss, or is trying to find out whether the store is open from a place at a distance. Thus, the output control unit 102 causes the output unit 80 to output the first guidance again.

As described above, the first guidance is "Move toward front of operation panel on left side of automatic door.", "Operation panel is here.", "Our store is in unattended business. You can enter store by performing operation needed for store entry with operation panel on left of automatic door.", "You can enter store by holding up store-entry QR code or capturing face with operation panel on left of automatic door", and the like.

On the other hand, when the second human detection sensor 72 detects the person P (YES in step S205), the output control unit 102 outputs the second guidance (step S207). The second guidance may include, for example, a content that lectures a customer about a store-entry method by using the operation terminal 40. Further, a volume of the second guidance may be smaller than a volume of the first guidance.

After the first guidance is output in step S203, the second human detection sensor 72 preferably continues to survey whether a person is detected for a few seconds to 10 seconds in step S205. In other words, surveillance preferably continues during time until the person P enters the detection range 76 from the detection range 74.

Further, in the present modification aspect, a presence position of a person is detected in two stages by using the two human detection sensors 70 and 72, and two kinds of guidance are used, but the number of sensors may be any number as long as presence of a person can be detected in a plurality of stages by dividing detection ranges. Further, presence of a person may be detected in three or more stages by dividing detection ranges, and three or more kinds of guidance may be selected and output according to the detection range.

Alternatively, the output control unit 102 may output different guidance according to a detection result of a person in a plurality of different detection ranges. In other words, the output control unit 102 may output different guidance according to a position of a person. For example, the output control unit 102 may output different guidance at a different volume when a person is detected in a position away from a store, when the person is detected in front of the automatic door 20, and when the person is detected in front of the operation terminal 40.

For example, when a volume is set in three stages and a person is detected in a position away from a store, the first guidance described above is output at a volume in a first stage. Subsequently, when the person is detected in front of the automatic door 20, the first guidance may be output at a volume in a second stage smaller than that in the first stage. Furthermore, subsequently, when the person is detected in front of the operation terminal 40, the second guidance described above may be output at a volume in a third stage smaller than that in the second stage.

By detecting a position in which the person P is present by an analysis of a captured image by using the camera 5 instead of the human detection sensor, the output control unit 102 may output different guidance according to the position in which the person P is detected.

According to this configuration, a store-entry method and a place of the operation terminal 40 can be notified to the person P standing still at a place slightly away from a store, and the person P can be called to the operation terminal 40, and, when the person P approaches the operation terminal 40, further different guidance can also be output and the person P can be supported in such a way as to be able to rapidly enter the store. Further, the second guidance has a volume smaller than that of the first guidance, and thus a measure against noise to a neighborhood of the store is taken.

Fifth Example Embodiment

A store-entry management apparatus 100 according to the present example embodiment is similar to that in any of the example embodiments described above except for a point that the store-entry management apparatus 100 according to the present example embodiment has a configuration for controlling a volume of voice guidance, based on a detection result of a volume detection unit installed at a store.

An output control unit 102 controls a volume of voice guidance, based on a detection result of the volume detection unit (not illustrated) installed at a store. For example, the volume detection unit may be a microphone 68 of an operation terminal 40, or may be a different microphone provided outside the store. The microphone 68 collects an environmental sound around the store, and measures a volume.

For example, a volume of voice guidance is set in three stages of a first volume, a second volume, and a third volume in a descending order of a volume. When traffic is heavy in front of a store and an environmental sound such as a sound under construction is equal to or more than a first reference value, the output control unit 102 sets a volume of voice guidance at the first volume. When traffic is not much at a store during the day and an environmental sound is less than the first reference value and equal to or more than a second reference value, the output control unit 102 sets a volume of voice guidance at the second volume. When traffic is little in front of a store during the night, and an environmental sound is less than the second reference value, the output control unit 102 sets a volume of voice guidance at the third volume.

According to the present example embodiment, an effect similar to that in the example embodiments described above can be achieved, and, furthermore, a volume of voice guidance is controlled according to a level of an environmental sound around a store, and thus a measure against noise to a neighborhood can be taken. Further, when traffic is heavy around a store and a surrounding environmental sound is loud, voice guidance can be made easier to be heard by controlling a volume.

Sixth Example Embodiment

A store-entry management apparatus 100 according to the present example embodiment is the same as that in any of the example embodiments described above except for a point that the store-entry management apparatus 100 according to the present example embodiment has a configuration for outputting voice guidance when acquisition processing of authentication information does not start even after a fixed period of time has elapsed. Here, description will be given on an assumption that the store-entry management apparatus 100 according to the present example embodiment has the same configuration as that of the store-entry management apparatus 100 according to the first example embodiment in FIG. 5, but the configuration according in the present example embodiment may be combined with the other example embodiment.

When a human detection sensor 70 detects a person and the acquisition processing of authentication information is not then performed in an operation terminal 40 even after a first reference time has elapsed, an output control unit 102 causes an output unit 80 to output voice guidance.

The first reference time is, for example, a few tens of seconds. In a situation where the acquisition processing of authentication information does not start even after the first reference time has elapsed, there is a high possibility that a person who visits a store tries to enter the store, but does not know a store-entry method and hesitates. Thus, the output control unit 102 causes the output unit 80 to output guidance having a content that gives a lecture about a method for causing a customer to provide authentication information needed for a store entry.

For example, the voice guidance output at this time includes a content that describes that there are a plurality of store-entry methods such as "If you have store-entry QR code, hold up QR code." and "If you don't have store-entry QR code, press capturing button for capturing face.", description of an operation needed to obtain consent for capturing a face such as "You need to provide QR code or capture your face for store entry." and "If you agree with capturing your face, press capturing button.", or the like.

Further, the acquisition processing of authentication information is determined by detecting, by an acquisition unit 104, reading of a store-entry QR code with a code reader 56 or pressing of a capturing button 60.

<Operation Example>

Figure 10:
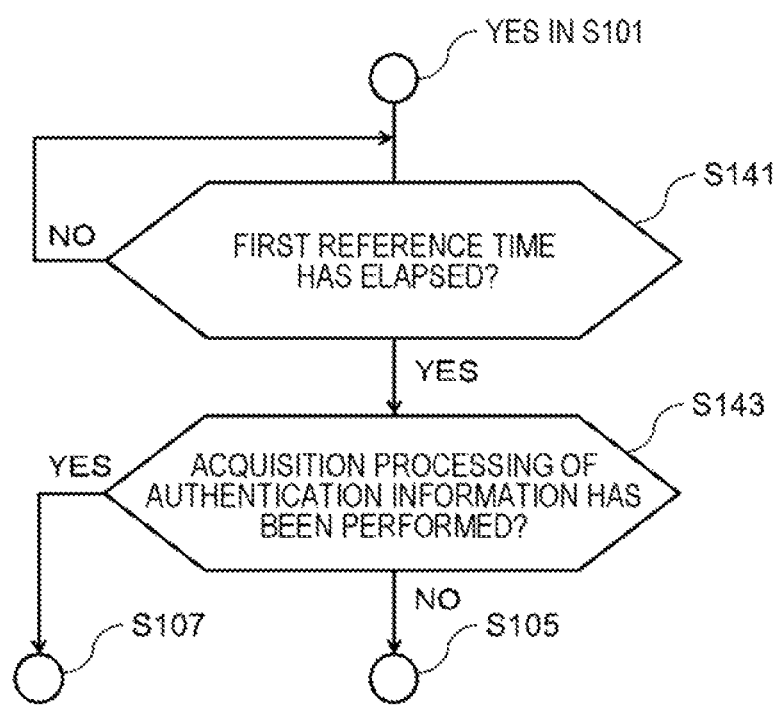
FIG. 10 is a flowchart illustrating an operation example of a store-entry management apparatus according to an example embodiment.

FIG. 10 is a flowchart illustrating an operation example of the store-entry management apparatus 100 according to the present example embodiment. The flowchart according to the present example embodiment is performed instead of step S103 in FIG. 6 after the human detection sensor 70 at an entrance of a store detects a person by a judgment in step S101 in FIG. 6 (YES in step S101).

After the human detection sensor 70 at the entrance of the store detects the person (YES in step S101), the output control unit 102 surveys whether the first reference time has elapsed (step S141). When the first reference time has elapsed (YES in step S141), whether the acquisition processing of authentication information has been performed, such as whether the capturing button 60 has been pressed or whether a store-entry QR code has been read with the code reader 56, is judged (step S143). Until the first reference time elapses (NO in step S141), the output control unit 102 continues to survey a lapse of time.

When it is judged that the acquisition processing of authentication information has been performed (YES in step S143), the processing bypasses step S105 in FIG. 6 and proceeds to step S107 in FIG. 6. In step S107 in FIG. 6, the acquisition unit 104 performs the acquisition processing of authentication information. On the other hand, when it is judged that the acquisition processing of authentication information has not been performed (NO in step S143), the processing proceeds to step S105 in FIG. 6. In other words, the output control unit 102 causes the output unit 80 to output voice guidance.

In this way, in a case where the acquisition processing of authentication information does not start even when the first reference time has elapsed since a person is detected, voice guidance can be output.

As described above, when a person is detected, and authentication information needed for a store entry is not then acquired even after a lapse of a few tens of seconds, there is a possibility that the person does not know an operation method and is at a loss. According to the present example embodiment, the output control unit 102 causes the output unit 80 to output voice guidance that lectures a customer about a store-entry method, and thus the customer who gives up entering a store and thinks about leaving can be helped, and a decrease in a usage rate of the store can be prevented.

Seventh Example Embodiment

A store-entry management apparatus 100 according to the present example embodiment has the same configuration as that of the store-entry management apparatus 100 according to the second example embodiment in FIG. 7 except for a point that the store-entry management apparatus 100 according to the present example embodiment has a configuration for outputting voice guidance when a face image that satisfies a reference is not acquired even after a fixed period of time has elapsed since a person is detected. However, a configuration of another example embodiment described below and a configuration including an image processing unit 120 according to the present example embodiment may be combined.

When a human detection sensor 70 detects a person and an image of a face that satisfies a reference is not then acquired even after a second reference time has elapsed, an output control unit 102 causes voice guidance to be output. The image of the face that satisfies the reference is an image having image quality in which a predetermined feature value needed for performing face authentication processing can be extracted. Alternatively, the image of the face that satisfies the reference is an image in which a feature value extracted from the face image has a feature value being identifiable from another person.

The second reference time is, for example, a few seconds to a few tens of seconds. A situation where a face image that satisfies a reference is not acquired even after the second reference time has elapsed is conceivably a situation where a customer tries to capture a face, but, for example, the face is not directed toward a camera 62, the face is moved, or the face is too far from or too close to the camera 62.

Then, the voice guidance includes at least one of "Direct your face toward front of camera.", "Face camera without moving your head for capturing.", "Step away from camera.", "Come closer to camera.", and the like.

Further, together with the voice guidance, a video, an image, or characters that give a lecture about a capturing method may be displayed as guidance on a display 54 of an operation terminal 40.

<Operation Example>

Figure 11:
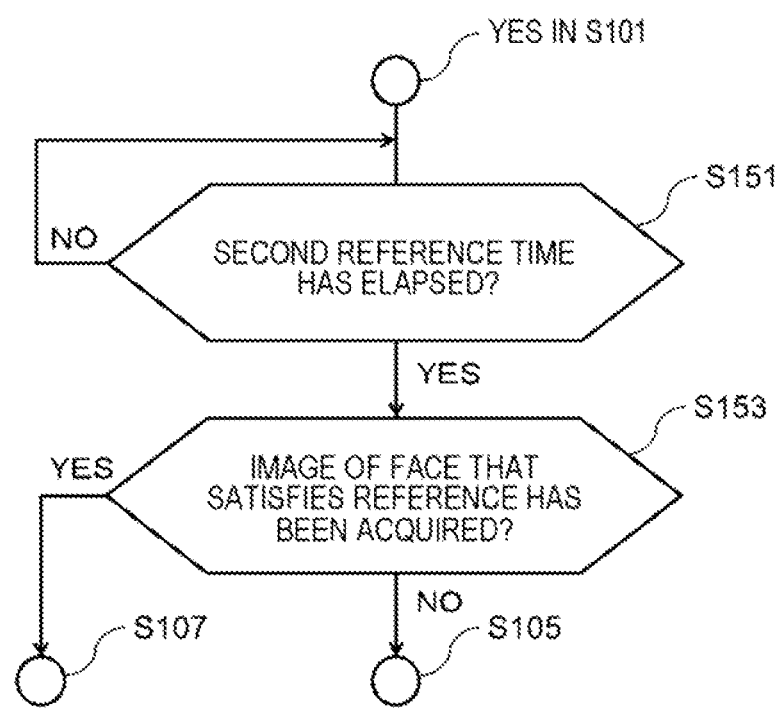
FIG. 11 is a flowchart illustrating an operation example of a store-entry management apparatus according to an example embodiment.

FIG. 11 is a flowchart illustrating an operation example of the store-entry management apparatus 100 according to the present example embodiment. The flowchart according to the present example embodiment is performed instead of step S103 in FIG. 6 after the human detection sensor 70 at an entrance of a store detects a person by a judgment in step S101 in FIG. 6 (YES in step S101).

After the human detection sensor 70 at the entrance of the store detects the person (YES in step S101), the output control unit 102 surveys whether the second reference time has elapsed (step S151). When the second reference time has elapsed (YES in step S151), whether an image of a face that satisfies a reference has been acquired is judged (step S153). Here, the output control unit 102 makes an inquiry of the image processing unit 120 about whether the face image that satisfies the reference has been acquired. On the other hand, until the second reference time elapses (NO in step S151), the output control unit 102 continues to survey a lapse of time.

When it is judged that the image of the face that satisfies the reference has been acquired (YES in step S153), the processing bypasses step S105 in FIG. 6 and proceeds to step S107 in FIG. 6. In step S107 in FIG. 6, an acquisition unit 104 performs acquisition processing of authentication information. On the other hand, when it is judged that the image of the face that satisfies the reference has not been acquired (NO in step S153), the processing proceeds to step S105 in FIG. 6. In other words, the output control unit 102 causes an output unit 80 to output voice guidance.

In this way, in a case where a face image that satisfies a reference is not acquired even when the second reference time has elapsed since a person is detected, voice guidance can be output.

As described above, when a person is detected, and authentication information that satisfies a reference is not then acquired even after a lapse of a few seconds to a few tens of seconds, there is a possibility that the customer is moving or cannot appropriately face the camera 62. Then, capturing of a face image that satisfies the reference can be made successful by outputting, to the customer, an instruction of a standing position or voice guidance indicating description of how to take a picture. Also, when it is taking a long time due to the authentication information failing to satisfy the reference, there is a possibility that a customer may give up and leave by thinking that equipment is faulty or a store is closed unless the customer understands the reason. In the present example embodiment, time for capturing a face for authentication can be shortened, and thus a customer can be prevented from giving up and leaving due to a long time being required.

Eighth Example Embodiment

Figure 12:
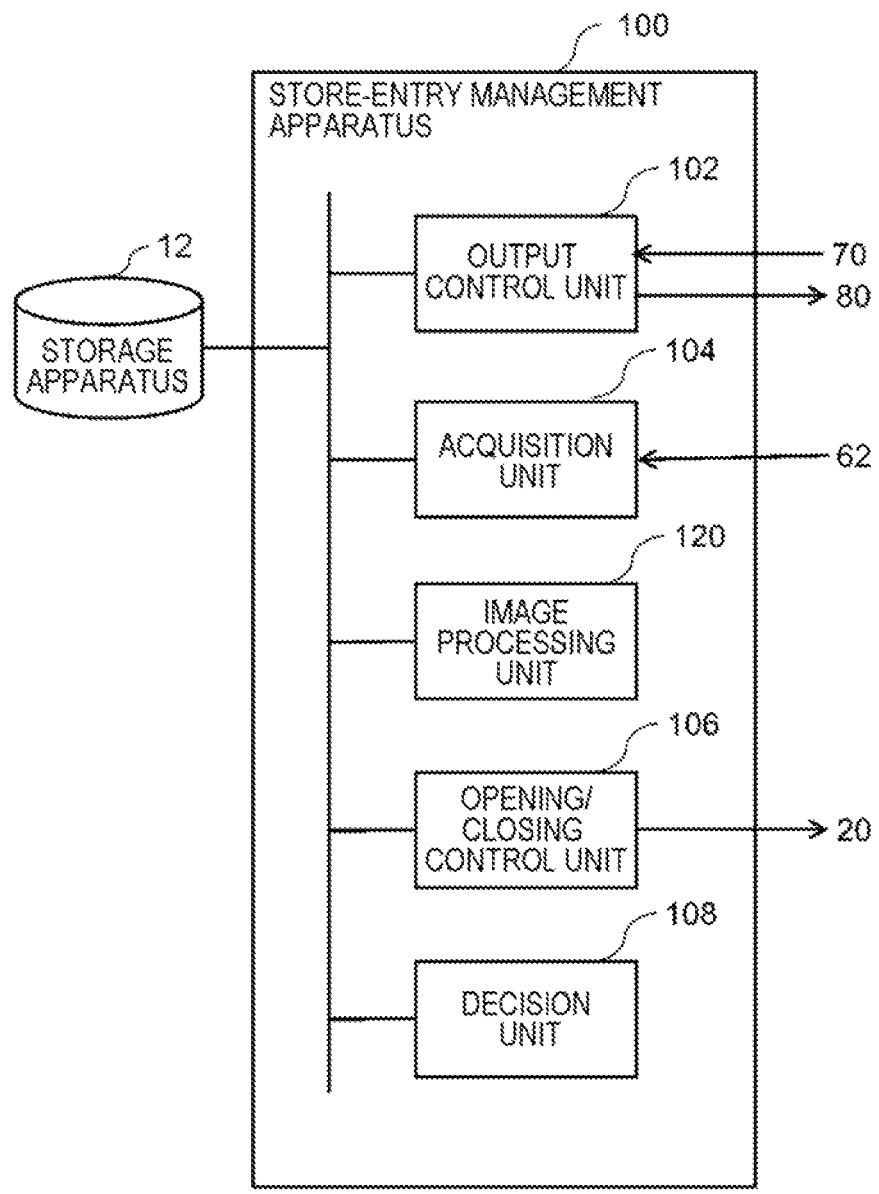
FIG. 12 is a functional block diagram logically illustrating a configuration example of a store-entry management apparatus according to an example embodiment.

FIG. 12 is a functional block diagram logically illustrating a configuration example of a store-entry management apparatus 100 according to the present example embodiment. The store-entry management apparatus 100 according to the present example embodiment is similar to that in any of the other example embodiments described above except for a point that the store-entry management apparatus 100 according to the present example embodiment has a configuration for deciding a guidance content and a notification method according to a situation of a person who visits a store. A configuration of the store-entry management apparatus 100 according to the present example embodiment combined with the second example embodiment in FIG. 7 will be described, but the configuration may be combined with the other example embodiment.

The store-entry management apparatus 100 according to the present example embodiment has the same configuration as that of the store-entry management apparatus 100 in FIG. 7, and also further includes a decision unit 108. The decision unit 108 repeatedly acquires a detection result of a human detection sensor 70, and decides at least one of a content of guidance and a notification method by using an analysis result of an image included in a plurality of the detection results. An output control unit 102 causes an output unit 80 to output guidance according to a content of decision.

In the present example embodiment, the human detection sensor 70 is, for example, a camera 5 provided on an upper portion of an automatic door 20 and having a capturing range of a person located in a region in front of the automatic door 20 and a region in front of an operation terminal 40. A person present near an entrance of a store is detected by performing image analysis processing by using a video or a plurality of frame images of the camera 5. The analysis result is associated with at least one of a content of guidance and a notification method being associated with a state of at least any of a position, a movement, and behavior of the person.

A state of a position, a movement, and behavior of a person at an entrance of a store may be assumed in advance and associated with at least one of a content of guidance and a notification method being suitable for the state. Furthermore, an analysis result of an image by the camera 5 may be associated with an assumed state of a position, a movement, and behavior of a person. In other words, an analysis result may be associated with at least one of a content of guidance and a notification method, and stored in a table, for example. In this way, the decision unit 108 can decide the content of the guidance and the notification method being associated with the analysis result by referring to the table.

For example, a content of guidance and a notification method are exemplified below, which are not limited thereto.
  (1) Voice guidance indicating that a store is in unattended business is output from a speaker 66 of the operation terminal 40.
  (2) Voice guidance that makes a notification that an operation on the operation terminal 40 is needed for a store entry is output from the speaker 66 of the operation terminal 40.
  (3) Voice guidance that notifies a place of the operation terminal 40 and a notification sound are output from the speaker 66. Alternatively, a video or an image is displayed on a display 54 of the operation terminal 40. An LED of the operation terminal 40 is turned on or blinked.
  (4) A video that describes a store-entry method is displayed on the display 54 of the operation terminal 40.
  (5) Guidance that specifically describes an operation method with a store-entry QR code is output by at least any one of a voice, an image, and a video.
  (6) Guidance that notifies presence of a code reader 56 of the operation terminal 40 is output by at least any one of a voice, an image, and a video.
  (7) Guidance that gives a lecture about holding up a store-entry QR code over the code reader 56 is output by at least any one of a voice, an image, and a video.
  (8) Guidance that specifically describes an operation method without a store-entry QR code is output by at least any one of a voice, an image, and a video.
  (9) Guidance that makes a notification that capturing of a face is needed, or makes a notification that an operation of a capturing button 60 is needed to obtain consent for capturing a face or perform capturing is output by at least any one of a voice, an image, and a video.
  (10) Guidance that tells a position of the capturing button 60 and a camera 62 is output by at least any one of a voice, an image, and a video.
  (11) Guidance that gives a lecture about a way of capturing in such a way that a face image satisfies a reference is output by at least any one of a voice, an image, and a video.
  (12) An operator at a center at a remote place is notified that a person at a loss for a store entry is present, and the operator is caused to ask the customer. The operator and the customer can communicate with each other by using the speaker 66 and a microphone 68. Further, a face of the operator may be displayed on the display 54.

(13) Guidance that makes a notification that an operator at a center at a remote place can be communicated and tells a communication method is output by at least any one of a voice, an image, and a video.

For example, when presence of a person standing still in front of the automatic door 20 is detected, the decision unit 108 decides at least any one of a content of guidance and a notification method of (1) to (3) described above. When a person standing still in front of the operation terminal 40 for a few seconds is detected, the decision unit 108 decides at least any one of a content of guidance and a notification method of (1) to (5) described above. When a person standing still in front of the operation terminal 40 for a few tens of seconds or going back and forth between the operation terminal 40 and the automatic door 20 is detected, the decision unit 108 decides at least any one of a content of guidance and a notification method of (5) to (13) described above.

<Operation Example>

Figure 13:
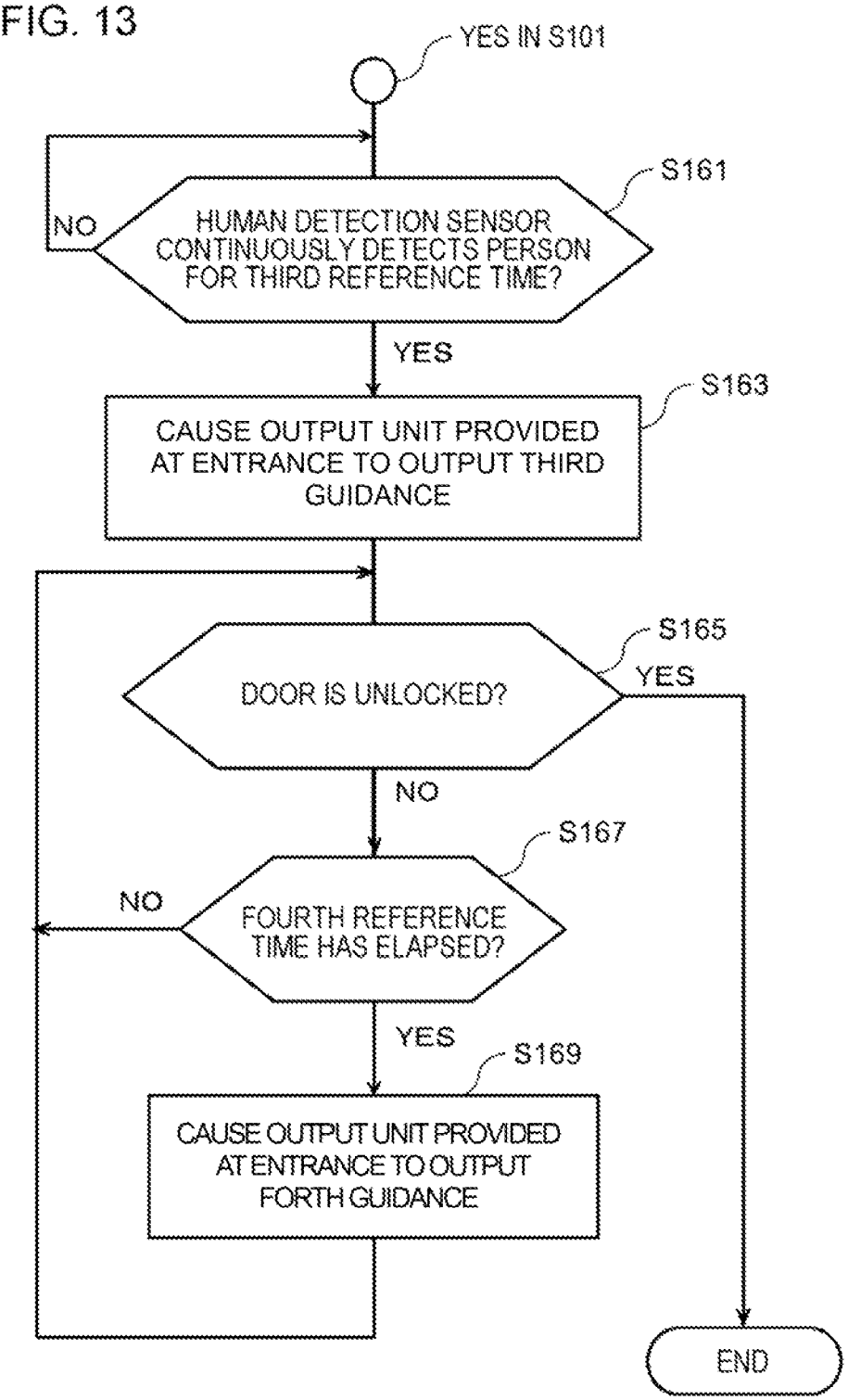
FIG. 13 is a flowchart illustrating an operation example of the store-entry management apparatus according to the example embodiment.

FIG. 13 is a flowchart illustrating an operation example of the store-entry management apparatus 100 according to the present example embodiment. The flowchart according to the present example embodiment is performed simultaneously with the processing in FIG. 6 after the human detection sensor 70 at an entrance of a store detects a person by a judgment in step S101 in FIG. 6 (YES in step S101). In other words, while the processing in FIG. 13 is performed, acquisition processing of authentication information by an acquisition unit 104 and unlocking/opening processing of the automatic door 20 by an opening/closing control unit 106 in the flow in FIG. 6 are performed.

After the human detection sensor 70 at the entrance of the store detects the person (YES in step S101), the human detection sensor 70 judges whether the human detection sensor 70 continuously detects the person for a third reference time (step S161). When the human detection sensor 70 continuously detects the person for the third reference time (YES in step S161), the output control unit 102 causes the output unit 80 to output third guidance (step S163).

The third guidance is, for example, (1) to (3) described above. Until the human detection sensor 70 continuously detects the person for the third reference time (NO in step S161), the output control unit 102 waits and continues to perform surveillance.

Furthermore, after step S163, the output control unit 102 judges whether the automatic door 20 is unlocked and opened (step S165). Then, when it is judged that the automatic door is unlocked and opened (YES in step S165), the present processing ends.

On the other hand, when it is determined that the automatic door 20 is not unlocked and opened (NO in step S165), the output control unit 102 judges whether a fourth reference time has elapsed (step S167). When the fourth reference time has elapsed (YES in step S167), the output control unit 102 causes the output unit 80 to output forth guidance (step S169). Then, the processing returns to step S165. On the other hand, until the fourth reference time elapses (NO in step S167), the processing returns to step S165.

The fourth guidance is, for example, at least any one of (4) to (11) described above.

Figure 14:
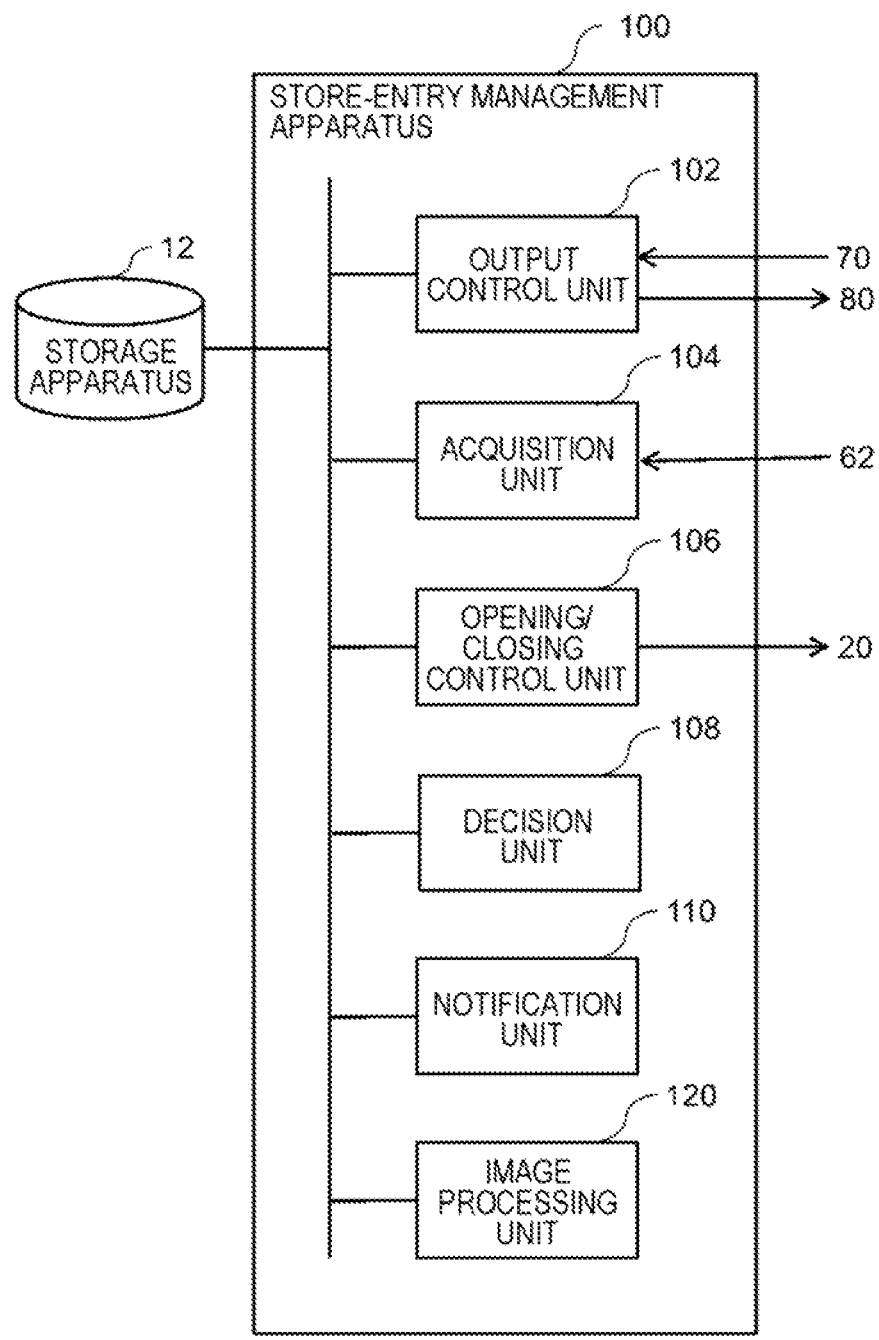
FIG. 14 is a functional block diagram logically illustrating a configuration example of the store-entry management apparatus according to the example embodiment.

Furthermore, as illustrated in FIG. 14, the store-entry management apparatus 100 according to the present example embodiment may further include a notification unit 110 in addition to the configuration in FIG. 12. The notification unit 110 notifies an operation center at a remote place when the fourth guidance is performed and a fifth reference time then further elapses.

<Operation Example>

Figure 15:
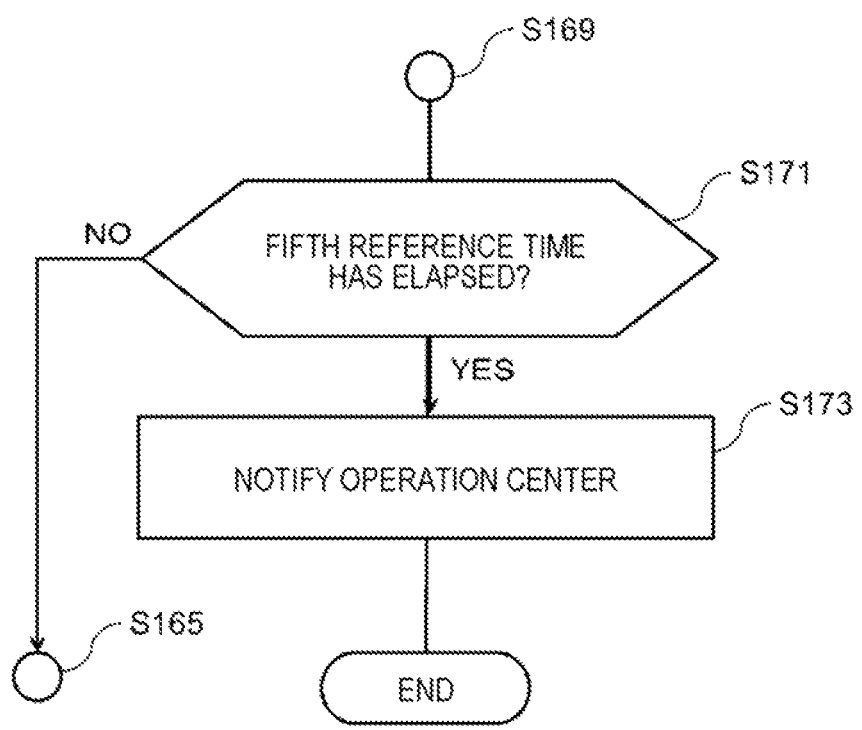
FIG. 15 is a flowchart illustrating an operation example of the store-entry management apparatus according to the example embodiment.

FIG. 15 is a flowchart illustrating an operation example of the store-entry management apparatus 100 according to the present example embodiment.

After the fourth guidance is output in step S169 in FIG. 13, the decision unit 108 further judges whether the fifth reference time has elapsed (step S171). On the other hand, until the fifth reference time elapses (NO in step S171), the processing returns to step S165 in FIG. 13.

On the other hand, when the fifth reference time has elapsed (YES in step S171), the decision unit 108 causes the notification unit 110 to notify an operator at a center at a remote place (step S173). Then, the operator receives the notification, and a store-entry method is described to a customer by using the speaker 66 and the microphone 68 of the operation terminal 40.

Instead of the operator at the center at the remote place, the notification unit 110 may be connected to, for example, artificial intelligence (AI), and AI may serve a customer.

According to the present example embodiment, at least one of a content of guidance and a notification method is decided by using a result acquired by performing analysis processing on a captured image of the camera 5 installed near the automatic door 20, and thus appropriate guidance that is suitable for behavior of a person can be output by an appropriate notification method. In this way, a customer can efficiently enter a store.

While the example embodiments of the present invention have been described with reference to the drawings, the example embodiments are only exemplification of the present invention, and various configurations other than the above-described example embodiments can also be employed.

For example, each procedure indicated in the flowchart in each of the example embodiments described above, for example, a procedure of the flowcharts in FIGS. 8, 9, 10, 11, 13, 15, and 17 may be acquired by combining a plurality of procedures within a consistent range. For example, after the flowchart in FIG. 17, the processing may proceed to the flowchart in FIG. 9 or 10.

The invention of the present application is described above with reference to the example embodiments and the examples, but the invention of the present application is not limited to the example embodiments and the examples described above. Various modifications that can be understood by those skilled in the art can be made to the configuration and the details of the invention of the present application within the scope of the invention of the present application.

Note that, when information related to a user is acquired and used in the present invention, this is lawfully performed.

A part or the whole of the above-described example embodiment may also be described in supplementary notes below, which is not limited thereto.

1. A store-entry management apparatus, including:
   an output control unit that causes, when a human detection sensor installed at an entrance of a store detects a person, an output unit provided at the entrance to output voice guidance of a store-entry method;
   an acquisition unit that acquires authentication information for authenticating a person from a terminal provided at the entrance; and
   an opening/closing control unit that unlocks and opens a door of the entrance when the acquired authentication information satisfies a reference, wherein the output control unit decides whether the voice guidance is needed by using a detection result of the human detection sensor before the authentication information is acquired, and controls an output of the voice guidance.

2. The store-entry management apparatus according to supplementary note 1, wherein
the authentication information is an image in which a face of the person is captured, and
the opening/closing control unit unlocks and opens a door of the entrance when an analysis result of the face included in the image satisfies a reference.

3. The store-entry management apparatus according to supplementary note 1 or 2, wherein
the terminal is installed beside the door, and
the output control unit causes first guidance to be output when the human detection sensor detects a person before the terminal starts acquisition processing of the authentication information.

4. The store-entry management apparatus according to supplementary note 3, wherein
the output control unit causes second guidance different from the first guidance to be output when the human detection sensor continues to detect a person even after the first guidance is output, and a volume of the second guidance is smaller than a volume of the first guidance.

5. The store-entry management apparatus according to supplementary note 3 or 4, further including
a second human detection sensor that has a second detection range smaller than a first detection range of the human detection sensor, and detects a person present near the door, wherein
the output control unit, after outputting the first guidance when the human detection sensor detects presence of a person within the first detection range, causes second guidance different from the first guidance to be output when the second human detection sensor detects presence of the person within the second detection range, and
a volume of the second guidance is smaller than a volume of the first guidance.

6. The store-entry management apparatus according to any one of supplementary notes 1 to 5, wherein
the output control unit controls a volume of the voice guidance, based on a detection result of a volume detection unit installed at the store.

7. The store-entry management apparatus according to any one of supplementary notes 1 to 6, wherein,
when the human detection sensor detects the person and acquisition processing of the authentication information is not then performed in the terminal even after a first reference time has elapsed, the output control unit causes the voice guidance to be output.

8. The store-entry management apparatus according to supplementary note 2 and any one of supplementary notes 3 to 7 citing supplementary note 2, wherein,
when the human detection sensor detects the person and the image of the face that satisfies a reference is not then acquired even after a second reference time has elapsed, the output control unit causes the voice guidance to be output.

9. The store-entry management apparatus according to any one of supplementary notes 1 to 8, further including
a decision unit that repeatedly acquires a detection result of the human detection sensor, and decides at least one of a content of guidance and a notification method by using an analysis result of an image included in a plurality of the detection results, wherein
the output control unit causes the guidance according to a content of decision to be output.

10. The store-entry management apparatus according to supplementary note 9, wherein
the output control unit
causes third guidance to be output when the human detection sensor continuously detects a person for a third reference time, and
then causes fourth guidance to be output when a fourth reference time elapses without the door being unlocked and opened.

11. The store-entry management apparatus according to supplementary note 10, further including
a notification unit that notifies an operation center when the fourth guidance is performed and a fifth reference time then further elapses.

12. A store-entry management method, including,
by a store-entry management apparatus:
causing, when a human detection sensor installed at an entrance of a store detects a person, an output apparatus provided at the entrance to output voice guidance of a store-entry method;
acquiring authentication information for authenticating a person from a terminal provided at the entrance;
unlocking and opening a door of the entrance when the acquired authentication information satisfies a reference; and
deciding whether the voice guidance is needed by using a detection result of the human detection sensor before the authentication information is acquired, and controlling an output of the voice guidance.

13. The store-entry management method according to supplementary note 12, wherein
the authentication information is an image in which a face of the person is captured,
the store-entry management method further including,
by the store-entry management apparatus,
unlocking and opening a door of the entrance when an analysis result of the face included in the image satisfies a reference.

14. The store-entry management method according to supplementary note 12 or 13, wherein
the terminal is installed beside the door,
the store-entry management method further including,
by the store-entry management apparatus,
causing first guidance to be output when the human detection sensor detects a person before the terminal starts acquisition processing of the authentication information.

15. The store-entry management method according to supplementary note 14, further including,
by the store-entry management apparatus,
causing second guidance different from the first guidance to be output when the human detection sensor continues to detect a person even after the first guidance is output, wherein
a volume of the second guidance is smaller than a volume of the first guidance.

16. The store-entry management method according to supplementary note 14 or 15, further including,
by the store-entry management apparatus,
by using a second human detection sensor that has a second detection range smaller than a first detection range of the human detection sensor, and detects a person present near the door, outputting the first guidance when the human detection sensor detects presence of a person within the first detection range, and thereafter causing second guidance different from the first guidance to be output when the second human detection sensor detects presence of the person within the second detection range, wherein
a volume of the second guidance is smaller than a volume of the first guidance.

17. The store-entry management method according to any one of supplementary notes 12 to 16, further including,
by the store-entry management apparatus,
controlling a volume of the voice guidance, based on a detection result of a volume detection unit installed at the store.

18. The store-entry management method according to any one of supplementary notes 12 to 17, further including,
by the store-entry management apparatus,
when the human detection sensor detects the person and acquisition processing of the authentication information is not then performed in the terminal even after a first reference time has elapsed, causing the voice guidance to be output.

19. The store-entry management method according to supplementary note 13 and any one of supplementary notes 14 to 18 citing supplementary note 13, further including,
by the store-entry management apparatus,
when the human detection sensor detects the person and the image of the face that satisfies a reference is not then acquired even after a second reference time has elapsed, causing the voice guidance to be output.

20. The store-entry management method according to any one of supplementary notes 12 to 19, further including,
by the store-entry management apparatus:
repeatedly acquiring a detection result of the human detection sensor, and deciding at least one of a content of guidance and a notification method by using an analysis result of an image included in a plurality of the detection results; and
causing the guidance according to a content of decision to be output.

21. The store-entry management method according to supplementary note 20, further including,
by the store-entry management apparatus:
causing third guidance to be output when the human detection sensor continuously detects a person for a third reference time; and
then causing fourth guidance to be output when a fourth reference time elapses without the door being unlocked and opened.

22. The store-entry management method according to supplementary note 21, further including,
by the store-entry management apparatus,
notifying an operation center when the fourth guidance is performed and a fifth reference time then further elapses.

23. A program causing a computer to execute:
a procedure of causing, when a human detection sensor installed at an entrance of a store detects a person, an output apparatus provided at the entrance to output voice guidance of a store-entry method;
a procedure of acquiring authentication information for authenticating a person from a terminal provided at the entrance;
a procedure of unlocking and opening a door of the entrance when the acquired authentication information satisfies a reference; and,
in the procedure of outputting, a procedure of deciding whether the voice guidance is needed by using a detection result of the human detection sensor before the authentication information is acquired, and controlling an output of the voice guidance.

24. The program according to supplementary note 23, wherein
the authentication information is an image in which a face of the person is captured,
the program further causing a computer to execute a procedure of unlocking and opening a door of the entrance when an analysis result of the face included in the image satisfies a reference.

25. The program according to supplementary note 23 or 24, wherein
the terminal is installed beside the door,
the program further causing a computer to execute
a procedure of causing first guidance to be output when the human detection sensor detects a person before the terminal starts acquisition processing of the authentication information.

26. The program according to supplementary note 25, further causing a computer to execute
a procedure of causing second guidance having a volume smaller than a volume of the first guidance and being different from the first guidance to be output when the human detection sensor continues to detect a person even after the first guidance is output.

27. The program according to supplementary note 25 or 26, further causing a computer to execute
a procedure of, by using a second human detection sensor that has a second detection range smaller than a first detection range of the human detection sensor, and detects a person present near the door, outputting the first guidance when the human detection sensor detects presence of a person within the first detection range, and thereafter causing second guidance having a volume smaller than a volume of the first guidance and being different from the first guidance to be output when the second human detection sensor detects presence of the person within the second detection range.

28. The program according to any one of supplementary notes 23 to 27, further causing a computer to execute
a procedure of controlling a volume of the voice guidance, based on a detection result of a volume detection unit installed at the store.

29. The program according to any one of supplementary notes 23 to 28, further causing a computer to execute
a procedure of, when the human detection sensor detects the person and acquisition processing of the authentication information is not then performed in the terminal even after a first reference time has elapsed, causing the voice guidance to be output.

30. The program according to supplementary note 24 and any one of supplementary notes 25 to 29 citing supplementary note 24, further causing a computer to execute
a procedure of, when the human detection sensor detects the person and the image of the face that satisfies a reference is not then acquired even after a second reference time has elapsed, causing the voice guidance to be output.

31. The program according to any one of supplementary notes 23 to 30, further causing a computer to execute:
    a procedure of repeatedly acquiring a detection result of the human detection sensor, and deciding at least one of a content of guidance and a notification method by using an analysis result of an image included in a plurality of the detection results; and
    a procedure of causing the guidance according to a content of decision to be output.

32. The program according to supplementary note 31, further causing a computer to execute:
    a procedure of causing third guidance to be output when the human detection sensor continuously detects a person for a third reference time; and
    a procedure of then causing fourth guidance to be output when a fourth reference time elapses without the door being unlocked and opened.

33. The program according to supplementary note 32, further causing a computer to execute
    a procedure of notifying an operation center when the fourth guidance is performed and a fifth reference time then further elapses.

This application is based upon and claims the benefit of priority from Japanese patent application No. 2020-080075, filed on Apr. 30, 2020, the disclosure of which is incorporated herein in its entirety by reference.

REFERENCE SIGNS LIST

1 Store-entry management system
3 Communication network
5 Camera
10 Server
12 Storage apparatus
20 Automatic door
30 Sensor
40 Operation terminal
50 Housing
52 Front surface
54 Display
56 Code reader
60 Capturing button
62 Camera
64 Capturing target description portion
65 Capturing icon display portion
66 Speaker
68 Microphone
70 Human detection sensor
80 Output unit
100 Store-entry management apparatus
102 Output control unit
104 Acquisition unit
106 Opening/closing control unit
108 Decision unit
110 Notification unit
120 Image processing unit
1000 Computer
1010 Bus
1020 Processor
1030 Memory
1040 Storage device
1050 Input/output interface
1060 Network interface

What is claimed is:

1. A store-entry management apparatus, comprising:
   at least one memory configured to store instructions; and
   at least one processor configured to execute the instructions to:
   cause, when a human detection sensor installed at an entrance of a store detects a person, an output unit provided at the entrance to output voice guidance of a store-entry method;
   acquire authentication information for authenticating a person from a terminal provided at the entrance;
   unlock and open door of the entrance when the acquired authentication information satisfies a reference;
   decide whether the voice guidance is needed by using a detection result of the human detection sensor before the authentication information is acquired, and controls an output of the voice guidance;
   repeatedly acquire a detection result of the human detection sensor, and decide at least one of a content of guidance and a notification method by using an analysis result of an image included in a plurality of the detection results; and
   cause the guidance according to a content of decision to be output, wherein
   the content of the guidance includes at least one of:
   notifying that an operation on the operation terminal is needed for the store entry;
   notifying a place of the operation terminal;
   notifying presence of a code reader of the operation terminal; and
   lecturing the customer about the store-entry method.

2. The store-entry management apparatus according to claim 1, wherein
   the authentication information is an image in which a face of the person is captured, and
   the at least one processor is further configured to execute the instructions to
   unlock and open a door of the entrance when an analysis result of the face included in the image satisfies a reference.

3. The store-entry management apparatus according to claim 1, wherein
   the terminal is installed beside the door, and
   the at least one processor is further configured to execute the instructions to
   cause first guidance to be output when the human detection sensor detects a person before the terminal starts acquisition processing of the authentication information.

4. The store-entry management apparatus according to claim 3, wherein
   the at least one processor is further configured to execute the instructions to
   cause second guidance different from the first guidance to be output when the human detection sensor continues to detect a person even after the first guidance is output, and
   a volume of the second guidance is smaller than a volume of the first guidance.

5. The store-entry management apparatus according to claim 3, further comprising
   a second human detection sensor that has a second detection range smaller than a first detection range of the human detection sensor, and detects a person present near the door, wherein
   the at least one processor is further configured to execute the instructions to after outputting the first guidance when the human detection sensor detects presence of a person within the first detection range, causes cause second guidance different from the first guidance to be output when the second human detection sensor detects presence of the person within the second detection range, and a volume of the second guidance is smaller than a volume of the first guidance.

6. The store-entry management apparatus according to claim 1, wherein the at least one processor is further configured to execute the instructions to control a volume of the voice guidance, based on a detection result of a volume detection unit installed at the store.

7. The store-entry management apparatus according to claim 1, wherein the at least one processor is further configured to execute the instructions to when the human detection sensor detects the person and acquisition processing of the authentication information is not then performed in the terminal even after a first reference time has elapsed, cause the voice guidance to be output.

8. The store-entry management apparatus according to claim 2, wherein the at least one processor is further configured to execute the instructions to when the human detection sensor detects the person and the image of the face that satisfies a reference is not then acquired even after a second reference time has elapsed, cause the voice guidance to be output.

9. The store-entry management apparatus according to claim 1, wherein the at least one processor is further configured to execute the instructions to cause third guidance to be output when the human detection sensor continuously detects a person for a third reference time, and then cause fourth guidance to be output when a fourth reference time elapses without the door being unlocked and opened.

10. The store-entry management apparatus according to claim 9, further comprising the at least one processor is further configured to execute the instructions to notify an operation center when the fourth guidance is performed and a fifth reference time then further elapses.

11. The store-entry management apparatus according to claim 1, wherein the content of the guidance further includes at least one of:
indicating that the store is in unattended business;
notifying that capturing of a face is needed, or makes a notification that an operation of a capturing button is needed to obtain consent for capturing a face or perform capturing;
indicating a position of the capturing button; and
notifying that an operator at a center at a remote place can be communicated and lecturing a communication method.

12. A store-entry management method, comprising,
by a store-entry management apparatus:
causing, when a human detection sensor installed at an entrance of a store detects a person, an output apparatus provided at the entrance to output voice guidance of a store-entry method;
acquiring authentication information for authenticating a person from a terminal provided at the entrance;
unlocking and opening a door of the entrance when the acquired authentication information satisfies a reference;
deciding whether the voice guidance is needed by using a detection result of the human detection sensor before the authentication information is acquired, and controlling an output of the voice guidance;
repeatedly acquiring a detection result of the human detection sensor, and deciding at least one of a content of guidance and a notification method by using an analysis result of an image included in a plurality of the detection results; and
causing the guidance according to a content of decision to be output, wherein
the content of the guidance includes at least one of:
notifying that an operation on the operation terminal is needed for the store entry;
notifying a place of the operation terminal;
notifying presence of a code reader of the operation terminal; and
lecturing the customer about the store-entry method.

13. A non-transitory computer-readable storage medium storing a program causing a computer to execute:
a procedure of causing, when a human detection sensor installed at an entrance of a store detects a person, an output apparatus provided at the entrance to output voice guidance of a store-entry method;
a procedure of acquiring authentication information for authenticating a person from a terminal provided at the entrance;
a procedure of unlocking and opening a door of the entrance when the acquired authentication information satisfies a reference;
in the procedure of outputting, a procedure of deciding whether the voice guidance is needed by using a detection result of the human detection sensor before the authentication information is acquired, and controlling an output of the voice guidance;
a procedure of repeatedly acquiring a detection result of the human detection sensor, and deciding at least one of a content of guidance and a notification method by using an analysis result of an image included in a plurality of the detection results; and
a procedure of causing the guidance according to a content of decision to be output, wherein
the content of the guidance includes at least one of:
notifying that an operation on the operation terminal is needed for the store entry;
notifying a place of the operation terminal;
notifying presence of a code reader of the operation terminal; and
lecturing the customer about the store-entry method.

* * * * *